United States Patent
Kodani et al.

(10) Patent No.: US 7,061,965 B2
(45) Date of Patent: Jun. 13, 2006

(54) METHOD AND APPARATUS FOR ASSIGNING WALSH CODES

(75) Inventors: Mayumi Kodani, Kawasaki (JP);
Shoichi Miyamoto, Kawasaki (JP);
Ayanori Matsuda, Sapporo (JP);
Takuya Mori, Tokyo (JP)

(73) Assignees: Fujitsu Limited, Kawasaki (JP);
Mobile Techno Corp., Kawasaki (JP)

( * ) Notice: Subject to any disclaimer, the term of this patent is extended or adjusted under 35 U.S.C. 154(b) by 810 days.

(21) Appl. No.: 09/999,388

(22) Filed: Oct. 31, 2001

(65) Prior Publication Data

US 2002/0146059 A1    Oct. 10, 2002

(30) Foreign Application Priority Data

Apr. 6, 2001    (JP)    .............................. 2001-108134

(51) Int. Cl.
*H04B 1/69*    (2006.01)

(52) U.S. Cl. ...................... 375/140; 375/130; 375/141; 370/208; 370/209

(58) Field of Classification Search ................ 375/130, 375/134–137, 140, 146, 147; 370/208–209, 370/320, 335, 341–342, 441
See application file for complete search history.

(56) References Cited

U.S. PATENT DOCUMENTS

| | | | | |
|---|---|---|---|---|
| 5,204,876 A | * | 4/1993 | Bruckert et al. | ............ 375/130 |
| 6,041,034 A | | 3/2000 | Fukumasa et al. | |
| 6,173,005 B1 | * | 1/2001 | Kotzin et al. | ................ 375/141 |
| 6,646,979 B1 | * | 11/2003 | Chen et al. | .................. 370/208 |

FOREIGN PATENT DOCUMENTS

| | | |
|---|---|---|
| JP | 10-190520 | 7/1998 |
| JP | 2000-232432 | 8/2000 |

* cited by examiner

*Primary Examiner*—Khai Tran
*Assistant Examiner*—Edith Chang
(74) *Attorney, Agent, or Firm*—Katten Muchin Rosenman LLP

(57) ABSTRACT

A Walsh code assigning apparatus includes a retaining unit retaining assignment order information about an order of assignment of the plural Walsh codes such that one Walsh code having a smaller bit length becomes unable to be orthogonally separated as being precedent over another Walsh code having a larger bit length and a controller including a retrieving unit retrieving an idle Walsh code having an assignment request bit length in accordance with the assignment order information retained in the retaining unit, and assigning unit assigning the idle Walsh code, which has been obtained by the retrieving unit, to the spreading code of a last-named communication channel for which the assignment request is issued.

40 Claims, 15 Drawing Sheets

FIG. 3

| ASSIGNMENT ORDER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| WALSH CODE | W0 | W8 | W4 | W12 | W2 | W10 | W6 | W14 | W1 | W9 | W5 | W13 | W3 | W11 | W7 | W15 |

FIG. 5A REQUEST FOR 8 BIT LENGTH

| ASSIGNMENT ORDER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| WALSH CODE | W0 | W8 | W4 | W12 | W2 | W10 | W6 | W14 | W1 | W9 | W5 | W13 | W3 | W11 | W7 | W15 |

FIG. 5B REQUEST FOR 4 BIT LENGTH

| ASSIGNMENT ORDER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| WALSH CODE | W0 | W8 | W4 | W12 | W2 | W10 | W6 | W14 | W1 | W9 | W5 | W13 | W3 | W11 | W7 | W15 |

FIG. 5C REQUEST FOR 16 BIT LENGTH

| ASSIGNMENT ORDER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| WALSH CODE | W0 | W8 | W4 | W12 | W2 | W10 | W6 | W14 | W1 | W9 | W5 | W13 | W3 | W11 | W7 | W15 |

FIG. 5D REQUEST FOR 2 BIT LENGTH

| ASSIGNMENT ORDER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| WALSH CODE | W0 | W8 | W4 | W12 | W2 | W10 | W6 | W14 | W1 | W9 | W5 | W13 | W3 | W11 | W7 | W15 |

Lmax : MAXIMUM BIT LENGTH OF WALSH CODES
L : ASSIGNMENT REQUEST BIT LENGTH OF WALSH CODE
m : THE NUMBER OF OCCUPYING CHANNEL CODES
k : THE NUMBER OF THE WALSH CODE IN ASSIGNMENT ORDER
N(k, m) : m WALSH CODES SEQUENTIALLY ARRANGED FROM k-TH WALSH CODE IN ASSIGNMENT ORDER

FIG. 7A

TABLE A: ASSIGNMENT ORDER OF 16-BIT-LENGTH WALSH CODE

| ASSIGNMENT ORDER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| WALSH CODE | W0 | W8 | W4 | W12 | W2 | W10 | W6 | W14 | W1 | W9 | W5 | W13 | W3 | W11 | W7 | W15 |

FIG. 7B

TABLE B: ASSIGNMENT ORDER OF 8-BIT-LENGTH WALSH CODE

| ASSIGNMENT ORDER | 1 | 2 | 3 | 4 | 5 | 6 | 7 | 8 |
|---|---|---|---|---|---|---|---|---|
| WALSH CODE | W0 | W8 | W4 | W12 | W2 | W10 | W6 | W14 |

FIG. 7C

TABLE C: ASSIGNMENT ORDER OF 4-BIT-LENGTH WALSH CODE

| ASSIGNMENT ORDER | 1 | 2 | 3 | 4 |
|---|---|---|---|---|
| WALSH CODE | W0 | W8 | W4 | W12 |

FIG. 7D

TABLE D: ASSIGNMENT ORDER OF 2-BIT-LENGTH WALSH CODE

| ASSIGNMENT ORDER | 1 | 2 |
|---|---|---|
| WALSH CODE | W0 | W8 |

Lmax : MAXIMUM BIT LENGTH OF WALSH CODES
L : ASSIGNMENT REQUEST BIT LENGTH OF WALSH CODE
m : THE NUMBER OF OCCUPYING CHANNEL CODES
k : THE NUMBER OF THE WALSH CODE IN ASSIGNMENT ORDER
d : RETRIEVE DIRECTION
dn : INDIVIDUAL RETRIEVE DIRECTION (dn=+1 OR ·1)
r : RETRIEVE LOOP COUNT
N(k, m) : m WALSH CODES SEQUENTIALLY ARRANGED FROM k-TH Walsh CODE IN ASSIGNMENT ORDER

FIG. 14

| AREA A | | AREA B | | AREA C | | AREA D | |
|---|---|---|---|---|---|---|---|
| ASSIGNMENT ORDER | WALSH CODE | ASSIGNMENT ORDER | WALSH CODE | ASSIGNMENT ORDER | WALSH CODE | ASSIGNMENT ORDER | WALSH CODE |
| 1 | W0 | 33 | W1 | 65 | W2 | 97 | W3 |
| 2 | W64 | 34 | W65 | 66 | W66 | 98 | W67 |
| 3 | W32 | 35 | W33 | 67 | W34 | 99 | W35 |
| 4 | W96 | 36 | W97 | 68 | W98 | 100 | W99 |
| 5 | W16 | 37 | W17 | 69 | W18 | 101 | W19 |
| 6 | W80 | 38 | W81 | 70 | W82 | 102 | W83 |
| 7 | W48 | 39 | W49 | 71 | W50 | 103 | W51 |
| 8 | W112 | 40 | W113 | 72 | W114 | 104 | W115 |
| 9 | W8 | 41 | W9 | 73 | W10 | 105 | W11 |
| 10 | W72 | 42 | W73 | 74 | W74 | 106 | W75 |
| 11 | W40 | 43 | W41 | 75 | W42 | 107 | W43 |
| 12 | W104 | 44 | W105 | 76 | W106 | 108 | W107 |
| 13 | W24 | 45 | W25 | 77 | W26 | 109 | W27 |
| 14 | W88 | 46 | W89 | 78 | W90 | 110 | W91 |
| 15 | W56 | 47 | W57 | 79 | W58 | 111 | W59 |
| 16 | W120 | 48 | W121 | 80 | W122 | 112 | W123 |
| 17 | W4 | 49 | W5 | 81 | W6 | 113 | W7 |
| 18 | W68 | 50 | W69 | 82 | W70 | 114 | W71 |
| 19 | W36 | 51 | W37 | 83 | W38 | 115 | W39 |
| 20 | W100 | 52 | W101 | 84 | W102 | 116 | W103 |
| 21 | W20 | 53 | W21 | 85 | W22 | 117 | W23 |
| 22 | W84 | 54 | W85 | 86 | W86 | 118 | W87 |
| 23 | W52 | 55 | W53 | 87 | W54 | 119 | W55 |
| 24 | W116 | 56 | W117 | 88 | W118 | 120 | W119 |
| 25 | W12 | 57 | W13 | 89 | W14 | 121 | W15 |
| 26 | W76 | 58 | W77 | 90 | W78 | 122 | W79 |
| 27 | W44 | 59 | W45 | 91 | W46 | 123 | W47 |
| 28 | W108 | 60 | W109 | 92 | W110 | 124 | W111 |
| 29 | W28 | 61 | W29 | 93 | W30 | 125 | W31 |
| 30 | W92 | 62 | W93 | 94 | W94 | 126 | W95 |
| 31 | W60 | 63 | W61 | 95 | W62 | 127 | W63 |
| 32 | W124 | 64 | W125 | 96 | W126 | 128 | W127 |

| OCCUPYING TIME | TYPE OF COMMUNICATION CHANNEL | ASSIGNMENT ORDER EXAMPLE #1 | ASSIGNMENT ORDER EXAMPLE #2 |
|---|---|---|---|
| LONG ↑ ↓ SHORT | SHARED CHANNEL | A→B→C→D | A(→B→···) |
| | TRAFFIC CHANNEL FOR SINGLE LOW-SPEED DATA | B→C→D→A | B(→C→D→···) |
| | TRAFFIC CHANNEL FOR SINGLE VOICE COMMUNICATION | C→D→A→B | C(→D→···) |
| | TRAFFIC CHANNEL FOR SINGLE HIGH-SPEED PACKET DATA COMMUNICATION | D→A→B→C | D(→A) |

FIG. 16

| PRIORITY | TYPE OF COMMUNICATION CHANNEL | ASSIGNMENT ORDER EXAMPLE #1 | ASSIGNMENT ORDER EXAMPLE #2 |
|---|---|---|---|
| HIGH ↑ ↓ LOW | SHARED CHANNEL | A→B→C→D | A(→B→···) |
| | PRIORITY (EMERGENCY) CALL CHANNEL | B→C→D→A | B(→C→D→···) |
| | TRAFFIC CHANNEL FOR SINGLE VOICE COMMUNICATION | C→D→A→B | C(→D→···) |
| | TRAFFIC CHANNEL FOR SINGLE HIGH-SPEED PACKET DATA COMMUNICATION | D→A→B→C | D(→A) |

FIG. 17

| DATA RATE | TYPE OF COMMUNICATION CHANNEL | ASSIGNMENT ORDER EXAMPLE #1 | ASSIGNMENT ORDER EXAMPLE #2 |
|---|---|---|---|
| HIGH ↑ ↓ LOW | DATA RATE #1 | A→B→C→D | A(→B→···) |
| | DATA RATE #2 | B→C→D→A | B(→C→D→···) |
| | DATA RATE #3 | C→D→A→B | C(→D→···) |
| | DATA RATE #4 | D→A→B→C | D(→A) |

METHOD AND APPARATUS FOR ASSIGNING WALSH CODES

BACKGROUND OF THE INVENTION

1. Field of the Invention

The present invention relates to a method and an apparatus for assignment of Walsh codes in a mobile (wireless) communication system, and more particularly to a method and an apparatus for assigning Walsh codes having different bit lengths to respective spreading codes of a plurality of communication channels.

2. Description of the Related Art

The second-generation communication system IS-95 is a technique of CDMA (Code Division Multiple Access). The IS-95 communication system is an official name, regulated by the ITU-R (International Telecommunication Union-Radio communication sector), of "cdmaOne" (trademark) that is a wireless or mobile communication system currently practiced in and outside Japan. The IS-95 communication system adopts orthogonal modulation of a Walsh sequence. Namely, in the IS-95 communication system, respective communication channels are distinguished by the mutual orthogonality of Walsh codes (i.e., having no correlations among Walsh codes), each Walsh code being assigned (allotted) to the spreading code of an individual communication channel. The communication channels are control channels (such as a pilot channel, a synch channel for synchronization capture, or a paging channel for sending paging information) and traffic channels.

Here, an individual Walsh code to be assigned to the communication channels has a fixed 64-bit length in the IS-95 communication system. Therefore a Walsh code is arbitrarily assigned to a communication channel as the IS-95 communication system never fails in assignment of a Walsh code because of Walsh codes that has been earlier assigned.

In the meantime, the third-generation communication system IS-2000 (called "CDMA2000" in Japan), as an alternative, handles traffic channels having much higher data rates than those of channels supported by the IS-95 communication system. The communication system IS-2000 that is going to put into practice assigns Walsh codes of a 128-bit length at the maximum to communication channels for "spreading rate 1", and Walsh codes of a 256-bit length at the maximum for "spreading rate 3". For example, a Walsh code having a smaller bit length should be assigned to a higher data rate.

In the IS-2000 communication system that handles communication channels having different data rates, Walsh codes having different bit lengths are assigned to the corresponding communication channels as the spreading codes. If signals to which the assigned Walsh codes having different bit lengths are multiplexed, some Walsh code become unable to be orthogonally separated because of the regularity of Walsh function.

FIG. 18 of the accompanying drawings illustrates the manner in which Walsh codes having different bit lengths become unable to be orthogonally separated because of the regularity of Walsh function. In FIG. 18, "Wx_y" represents a Walsh code whose number is x and which has a y-bit length, and the maximum and minimum bit lengths are 16 and 2, respectively. As depicted in a hatched portion of FIG. 18, when the Walsh code "W2_4" is assigned, two Walsh codes "W2_8" and "W6_8" which are derived from the Walsh code "W2_4" and four Walsh codes "W2_16", "W1_16", "W6_16", and "W14_16" which are further derived from the two Walsh codes "W2_8" and "W6_8" become unable to be assigned due to the mutual correlations among the derived six Walsh codes and the original code "W2_4". This means that the Walsh code "W2_4" can be assigned to a spreading code only when all the other Walsh codes which are derived from the Walsh code "W2_4" are not occupied (assigned).

For this reason, the IS-2000 communication system would encounter with the following problem. When Walsh codes are arbitrary assigned likewise the conventional communication system IS-95, the remaining idle Walsh codes tend to be in a circumstance where no Walsh code in a small bit length for a communication channel of high data rate remains despite of a lot of idle Walsh codes in large bit lengths for communication channel for low data rate remain. As a result, subsequent assigning of Walsh codes having small bit lengths would tend to become impossible.

For example, assuming that four Walsh codes "W0_16", "W1_16", "W2_16", and "W3_16" are already assigned as shown in FIG. 19, it is possible to further assign twelve channels for Walsh codes of a 16-bit length or four channels for Walsh codes of an 8-bit length. Nonetheless it would be impossible to assign any Walsh code having a 4-bit length or a 2-bit length.

SUMMARY OF THE INVENTION

With the foregoing problems in view, it is an object of the present invention to provide a method and an apparatus for efficient assignments of Walsh codes by controlling the order of the assignment in a communication system in which Walsh codes having different bit lengths are mixedly used.

To attain the above-mentioned object, as a first generic feature of the present invention, there is provided a method for assigning a plurality of Walsh codes having different bit lengths to respective spreading codes of a plurality of communication channels, the method comprising the steps of: (a) setting assignment order information about an order of assignment of the plural Walsh codes of different bit lengths such that one Walsh code having a smaller bit length becomes unable to be orthogonally separated as being precedent over another Walsh code having a larger bit length; (b) retrieving, over the plural Walsh codes, an idle Walsh code which is not assigned to any spreading code in accordance with the set assignment order information, the idle Walsh code having an assignment request bit length to be assigned to a communication channel for which an assignment request is issued; and (c) assigning the obtained idle Walsh code to the spreading code of the last-named communication channel for which the assignment request is issued.

As a preferable feature, the method may comprise the step of setting a plurality of retrieve starting positions for the respective bit lengths of the plural Walsh codes so that, in the retrieving step (b), the retrieving of an individual idle Walsh code starts at the set retrieve starting position corresponding to the respective assignment request bit length.

As another preferable feature, the method may comprise the step of setting a plurality of retrieve starting positions and retrieve directions for the respective bit lengths of the plural Walsh codes so that, in the retrieving step (b), the retrieving of an individual idle Walsh code starts at the set retrieve starting position in the set retrieve direction which correspond to the respective assignment request bit length.

As still another preferable feature, the method may comprise the steps of: dividing the assignment order in the set assignment order information into a plurality of areas; allocating one of the plural areas as a retrieve starting area for the retrieving in the retrieving step (b) with respect to an individual type of the plural communication channels. In this case, as a further preferable feature, the retrieving of an individual idle Walsh code with respect to the respective type of the plural communication channels may be carried out over a part of the plural areas in the retrieving step (b).

As the second generic feature, there is provided an apparatus for assigning a plurality of Walsh codes having different bit lengths to respective spreading codes of a plurality of communication channels, the apparatus comprising: retaining means for retaining assignment order information about an order of assignment of the plural Walsh codes such that one Walsh code having a smaller bit length becomes unable to be orthogonally separated as being precedent over another Walsh code having a larger bit length; and controlling means for controlling Walsh code assignment, the controlling means including: retrieving means for retrieving, among the plural Walsh codes, an idle Walsh code which is not assigned to any spreading code in accordance with the assignment order information retained in the retaining means, the idle Walsh code having an assignment request bit length to be assigned to a communication channel for which an assignment request is issued; and assigning means for assigning the idle Walsh code, which has been obtained by the retrieving means, to the spreading code of the last-named communication channel for which the assignment request is issued.

As a preferable feature, the controlling means may include position setting means for setting a plurality of retrieve starting positions for the respective bit lengths of the plural Walsh codes so that the retrieving means starts the retrieving of an individual idle Walsh code at the retrieve starting position which has been set by the position setting means and corresponds to the respective assignment request bit length.

As another preferable feature, the controlling means may include position/direction setting means for setting a plurality of retrieve starting positions and retrieve directions for the respective bit lengths of the plural Walsh codes so that the retrieving means starts the retrieving of an individual idle Walsh code at the retrieve starting position in the retrieve direction, which have been set by the position/direction setting means and correspond to the respective assignment request bit length.

As still another preferable feature, controlling means may include: area setting means for setting a plurality of areas by dividing the assignment order information, which is retained in the retaining means, into such plural areas; and area controlling means for performing an area control by allocating one of the plural areas as a retrieve starting area for the retrieving that is to be performed by the retrieving means with respect to an individual type of the plural communication channels.

In this case, as an additional preferable feature, the area controlling means may set a retrieving area of an individual idle Walsh code with respect to the individual type of the plural communication channels over a part of the plural areas.

With the foregoing features of the method and apparatus for assigning Walsh codes to spreading codes of respective communication channel, it is possible to guarantee the following advantageous results:

(1) With the assignment order information about an order of assignment of the plural Walsh codes of different bit lengths such that one Walsh code having a smaller bit length becomes unable to be orthogonally separated as being precedent over another Walsh code having a larger bit length, an idle Walsh code having an assignment request bit length is retrieved over the plural Walsh codes in accordance with the assignment order information in order to assign the retrieved idle Walsh code to the spreading code of a communication channel for which an assignment is requested. As a result, since it is possible to avoid the circumstance where a Walsh code having a smaller bit length cannot be assigned as antecede assignments are arbitrarily performed, Walsh codes having any bit length can be assigned with efficiency, greatly reducing the call blocking probability.

(2) Partly since the retrieve starting positions are set for the respective bit lengths of the Walsh codes in the assignment order information, and partly since the retrieving of an idle Walsh code can be started at the set retrieve staring position corresponding to the assignment request bit length, the assigned Walsh codes are dispersed over the assignment order information and it is possible to further reduce the call blocking probability due to enhanced success in the assignments.

(3) Partly since the retrieve starting positions and the retrieve directions are set for the respective bit lengths of the Walsh codes in the assignment order information, and partly since the retrieving of an idle Walsh code can be started at the set retrieve staring position in the retrieve direction which correspond to the assignment request bit length, it is possible to set assignment conditions in detail due to the increased number of combinations of the assignment (retrieval) orders as compared with the case that only the retrieve starting positions are set.

(4) Since the assignment order information is divided into a plurality of areas and one of the plural areas (respective different areas) are allocated as a retrieve starting area for an individual type of the plural communication channel, the assigned Walsh codes are uniformly dispersed over the assignment order information, further improving the assignments.

(5) With the plural areas in the assignment order information, partly since the retrieving of an individual idle Walsh code with respective type of the plural communication channel may be performed over a part of the plural areas, and partly since the retrievals regarding the each type of the communication channels are independently performed (region for the respective retrievals do not overlaps each other), it is possible to guarantee the minimum number of communication channels to which Walsh codes are assigned with respect to the individual type of communication channels.

(6) If the individual type of communication channels is defined in terms of the lengths of estimated time periods during which the respective communication channels occupy the individual Walsh codes, it is possible to level the frequency of assigning Walsh codes in the individual area and it is also possible to improve the success rate of assignment, reducing the call blocking probability.

(7) If the individual type of the plural communication channels is defined in terms of priorities among the plural communication channels, it is possible to assign Walsh codes to priority calls as much as possible by minimizing the blocking because it is possible to guarantee the minimum number of priority communication channels.

(8) If the individual type of the plural communication channels is defined in terms of data rates of the respective communication channels, it is possible to avoid frequently occurring the blocking for particular type of communication channels since it is possible to guarantee the minimum number of assigned Walsh codes to each type of communication channel (data rate).

Other objects and further features of the present invention will be apparent from the following detailed description when read in conjunction with the accompanying drawings.

BRIEF DESCRIPTION OF THE DRAWINGS

FIG. 3 is a diagram showing an example of a table of an assignment order of Walsh codes of the first embodiment;

FIGS. 5A through 5D are tables of respectively assistance in explaining a method for assigning Walsh codes of the first embodiment;

FIGS. 7A through 7D are tables similar to FIGS. 5A through 5D, but of assistance in explaining a method for assigning Walsh codes of the first modification;

FIG. 14 is a diagram showing an example of a table an assignment of order of Walsh codes of the fourth embodiment;

FIG. 15 is a diagram showing an order of retrieve (assignment) areas with respect to various types of communication channels in terms of lengths of estimated occupation times of the fourth embodiment;

FIG. 16 is a diagram showing an order of retrieve (assignment) areas with respect to various types of communication channels in terms of priorities of the fourth embodiment;

FIG. 17 is a diagram showing an order of retrieve (assignment) areas with respect to various types communication channels in terms of data rates of the fourth embodiment; and FIGS. 18 and 19 are diagrams, as assistance in explaining problems in conventional technique, respectively showing images of Walsh codes having different bit lengths becoming unable to be orthogonally separated because of the regularity of Walsh function.

DESCRIPTION OF THE PREFERRED EMBODIMENTS

Throughout this specification, Walsh codes can be have bit lengths (2, 4, 8, 16 . . . ) of 2 to the power of a natural number and each of Walsh code does not have a fixed bit length. For example, the first Walsh codes are "W1_2", "W1_4", "W1_8", "W1_16" . . . in accordance with respective bit lengths of 2, 4, 8, 16 . . . .

A preferred embodiment and its various modifications of the present invention will now be described with reference to the accompanying drawings.

(A) First Embodiment

Figure 1:
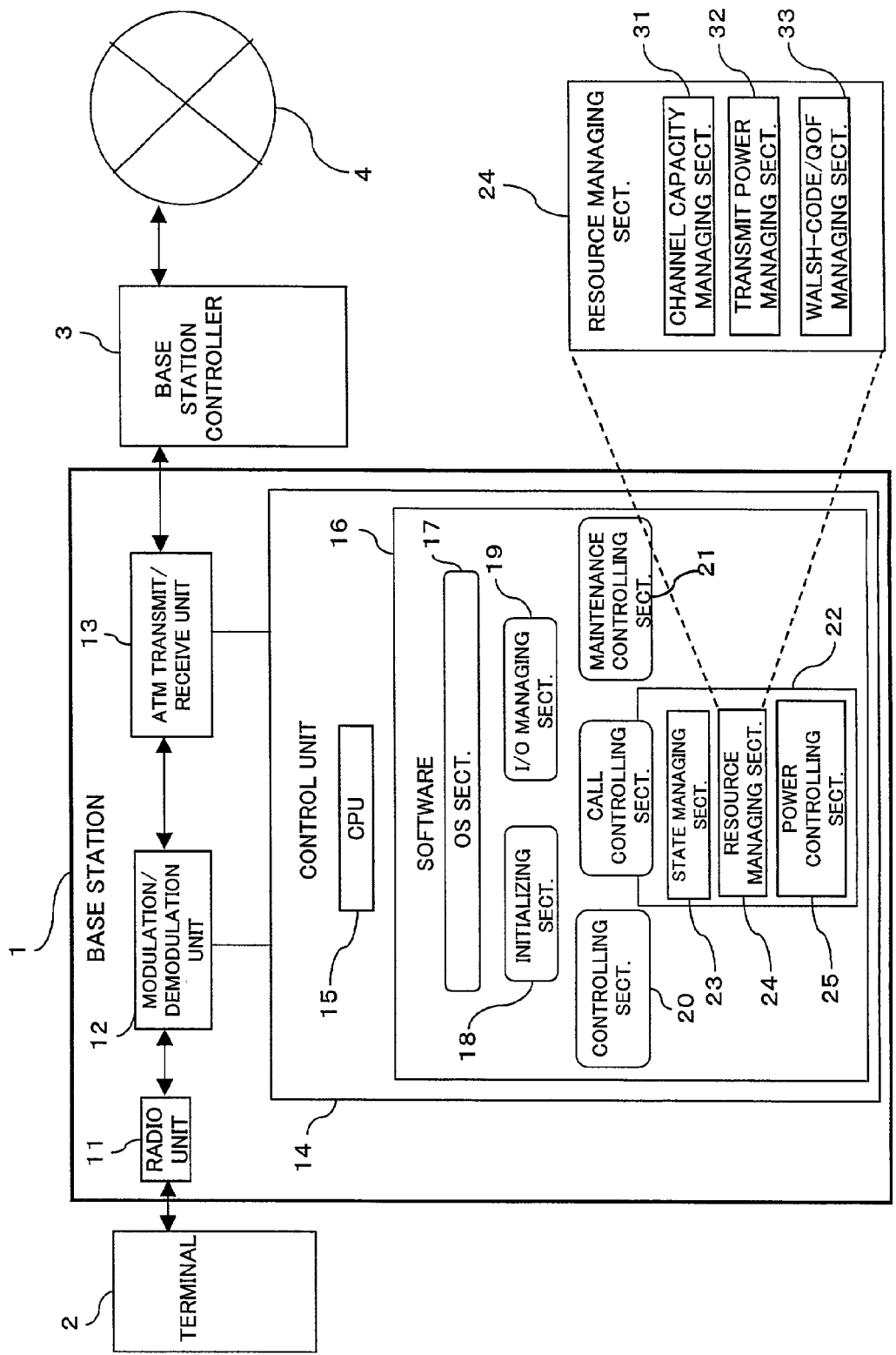
FIG. 1 is a block diagram schematically showing, focusing on a base station, a CDMA communication (IS-2000) system to which an apparatus (a method) for assigning Walsh codes according to a first embodiment of the present invention is applied.

FIG. 1 shows a CDMA (Code Division Multiple Access) communication system to which an apparatus (a method) for assigning Walsh codes according to a first embodiment is applied, focusing on a base station. As shown in FIG. 1, the CDMA communication system comprises a base station 1, a terminal 2, such as a mobile telephone, a base station controller 3, a public network 4, such as an ATM (Asynchronous Transfer Mode) network, a packet network, and/or Internet. The base station 1 and the terminal 2 handle CDMA.

One terminal 2 appears in FIG. 1, however in an actual embodiment, a plurality of terminals 2 accesses the base station 1. Generally, the public network (hereinafter simply called "network") 4 is realized by connecting a plurality of exchanges, such as ATM exchanges, packet exchanges, and/or routers.

The base station controller 3 receives a signal destined for the terminal 2 via the network 4, and distributes the signal to the base station 1 manages over an area (hereinafter also called a "visitor cell") in which the terminal 2 is positioned. Meanwhile, the base station controller 3 transmits a signal from the base station 1 (a signal transmitted from the terminal 2) to the network. The base station controller 3 successively grasps the positioning (the visitor cell) of the terminal 2 by periodically positioning registrations known in the art.

The base station 1 communicates with the terminal 2 positioned within its visitor cell, and transmits a signal from the terminal 2 to the network 4 via the base station controller 3. Additionally, the base station 1 receives a signal via the network 4, which signal has been distributed by the base station controller 3, and transmits the signal to the terminal 2. The base station 1 also processes CDMA signals.

To realize these functions, the base station 1 comprises a radio unit 11, a modulation/demodulation unit 12, an ATM transmit/receive unit 13, and a control unit 14, as main elements. The radio section 11 receives an RF (Radio Frequency) signal transmitted from the terminal 2 and down-converts the received RF signal to an IF (Intermediate Frequency) signal. The radio section also up-converts an IF signal to be transmitted to the terminal 2 to an RF signal after the modulation/demodulation unit 12 performs a spectrum spreading modulation on the IF signal using a spreading code assigned to an individual terminal 2.

The modulation/demodulation unit 12 demodulates an IF signal (an uplink signal) which is destined for the terminal 2 and which is received from the radio unit 11 by performing an inverse spectrum spreading using the spreading code. On the other hand, the modulation/demodulation unit 12 modulates an IF signal (a downlink signal) that is destined for the terminal 2 and that is to be transmitted to the radio unit 11 by performing a spectrum spreading using a spreading code. In the IS-2000 system, a spreading code for an uplink signal is different from that for a downlink signal. The modulation/demodulation 12 includes a RAKE combiner capable of enhancing resistance to multi-path fading.

The ATM transmit/receive unit 13 makes a baseband signal that is demodulated by the modulation/demodulation unit 12 into an ATM cell, that is, stores data of the baseband signal in a payload (48 bytes) and attaches an overhead (5 bytes) having destination information or the like to the payload. Thereupon, the ATM transmit/receive unit 13 transmits the ATM cell to the base station controller 3. Conversely, the ATM transmit/receive unit 13 splits an ATM cell received from the base station controller 3 so as to obtain signal data to be modulated by the modulation/demodulation unit 12.

Namely, the base station 1 transmits/receives signals with the base station controller 3 on an ATM cell basis. Otherwise, signal communication between the base station 1 and the base station controller 3 should by no means be limited to the ATM cell basis. As an alternative, the signal communication may be performed via another signal format (protocol) as the base station 1 serves a function for converting the signal protocol.

The control unit 14 controls overall operations performed in the base station 1. For example, the control unit 14 executes centralized management (control) over a spectrum spreading and an inverse spectrum spreading performed by the modulation/demodulation section 12, an assembly and a split of an ATM cell by the ATM transmit/receive unit 13 or the like by using particular software.

Specifically, a CPU 15 installed in the control unit 14 reads software 16 stored in a memory, such as a ROM or a RAM, whereupon a relevant function is executed. The software 16 includes programs that make the CPU 15 function as, for example, an OS (Operation System) section 17, an initializing section 18, an input/output (I/O) managing section 19, a controlling section 20, a maintenance managing section 21, a call controlling section 22 (a state managing section 23, a resource managing section 24, and a power controlling section 25). These sections help the control unit 14 with proper processes of initialization, a call control, and maintenance management when starting or restoring the base station 1.

In the call controlling section 22, the state managing section 23 manages call states, such as a ready state, a control channel active state, or a traffic channel active state, in accordance with a state of a connection of a channel. The resource managing section 24 manages resources, such as capacity of a channel, transmission power, assignment of a Walsh code, and QOF (quasi-orthogonal function). For these purposes, the resource managing section 24 comprises a channel capacity managing section 31, a transmitting power managing section 32, and a Walsh-code/QOF managing section 33, as shown in FIG. 1. The power controlling section 25 controls the electric power of the base station 1.

In the illustrated example, the Walsh-code/QOF managing section 33 serves to function to control order of assignments of Walsh codes to avoid a circumstance where a Walsh code having a smaller bit length tend to be unable to assigned in a contrary fashion to the above-mentioned conventional art.

Figures 18, 19:
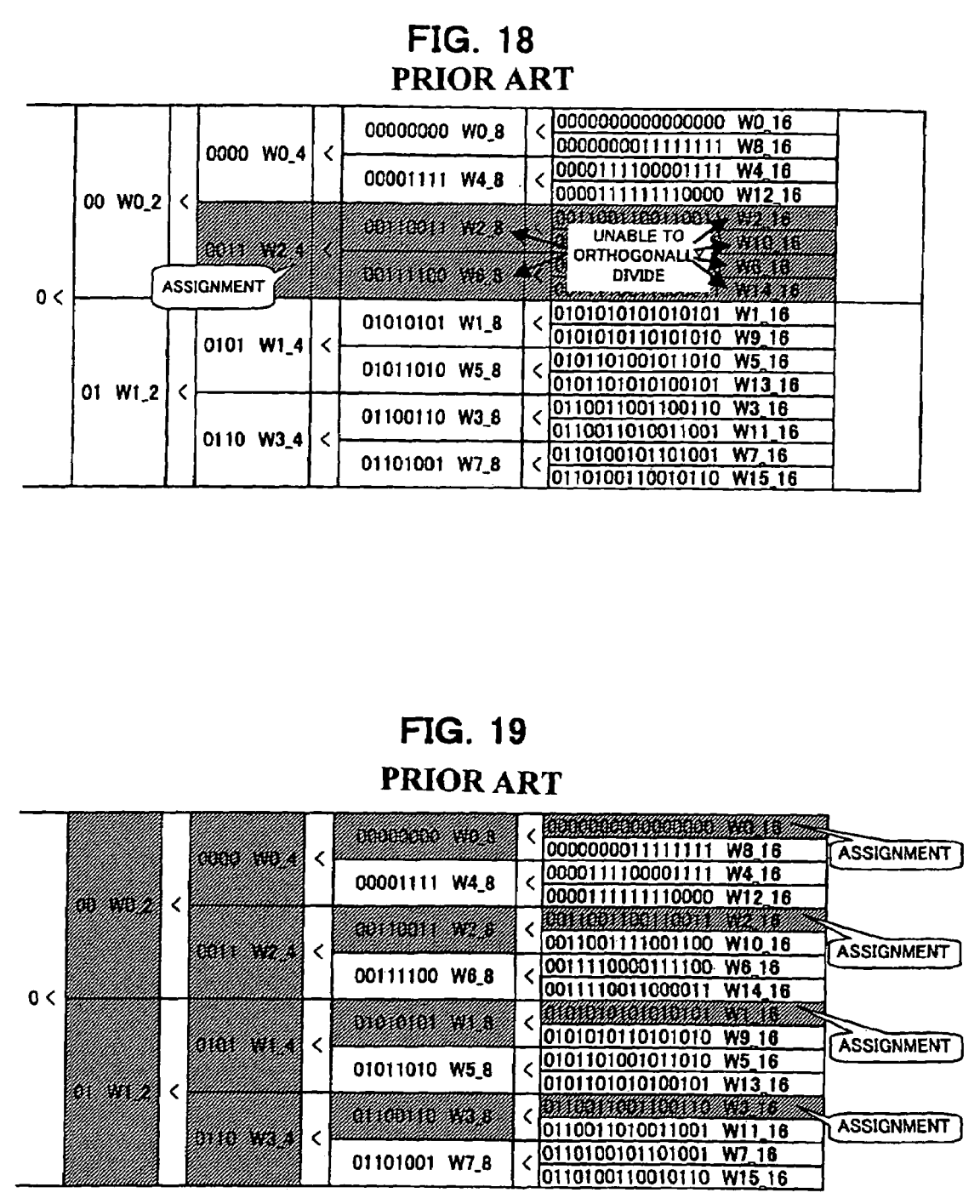

In other words, if the Walsh code "W0_16" is assigned at first, it is not possible to assign the Walsh code "W0_8" due to the regularity of Walsh function, as shown in FIGS. 18 and 19. At that time, if a request to assign a Walsh code of a 16-bit length is issued, the Walsh code "W8_16" is assigned to minimize the influence on other Walsh codes having an 8-bit length. Similarly, since it is not possible to assign the Walsh code "W0_4", the Walsh code "W4_16" is assigned whereupon the Walsh code "W12_16" is assigned when requests to assign a Walsh code of a 16-bit length are issued. Thereby, assignment of the two Walsh codes of 16-bit length dose not result in any Walsh codes of 4-bit length becoming unable to be assigned.

Accordingly, if the Walsh code "W0_16" is assigned at first, the order of the subsequent assignments of Walsh codes is "W8_16", "W4_16", "W12_16", "W2_16", "W10_16", "W6_16", and then "W14_16" so as to minimize the influence, caused by an assignment of a Walsh code having a larger bit length, on other Walsh codes having smaller bit lengths. Otherwise, the orders between "W4_16" and "W12_16", between "W2_16" and "W1_16", between "W6_16" and "W14_16" are arbitrarily exchanged, and the order between a set of "W2_16" and "W10_16" and a set of "Ws6_16" and "W14_16" is also arbitrarily exchanged.

In the illustrated embodiment, an order of assignment of Walsh code (an assignment order table 330; FIG. 3) is set in such a sequence that one Walsh code having a smaller bit length becomes unable to be orthogonally separated as being precedent over another Walsh code having a larger bit length, i.e., as a bit length of a Walsh code which has been set at first becomes smaller, the codes become unable to be orthogonally separated in the order. This means that one Walsh code, having a one-half bit length of that of a Walsh code assigned first place in the order (hereinafter also called the first Walsh code), that becomes unable to be orthogonally separated is assigned second place in the order; one Walsh code, having a one-quarter bit length of the first Walsh code, that becomes unable to be orthogonally separated is assigned third place; and one Walsh code, having a one-eighth bit length of the first Walsh code, that becomes unable to be orthogonally separated is assigned forth place. Namely, the fist Walsh codes is set arbitrarily, and the second Walsh code should be set to the code which becomes unable to be orthogonally separated when the first Walsh code in used in a one-half of the maximum bit length. In succession, the third and fourth codes should be set to the codes which become unable to be orthogonally separated when the first Walsh code is used in a one-quarter of the maximum bit length. The following assignment order should be set in the same way.

After the order of assignments of Walsh code is set, when a request for assignment of a Walsh code having a one-half of the maximum bit length is issued, an idle (hereinafter also called "void") Walsh code to be assigned is retrieved every two Walsh codes over the assignment order table 330; when a request for assignment of a Walsh code having one-quarter of the maximum bit length is issued, an idle Walsh code to be assigned is retrieved every four Walsh codes; and when a request for assignment of a Walsh code having one-Nth (N is 2 to a power of a natural number) of the maximum bit length is issued, an idle Walsh code to be assigned is retrieved every N Walsh codes. N Walsh codes that become unable to be orthogonally separated by the assignment of one of the plural Walsh codes having one-Nth bit length of the maximum bit length are regarded as a group (a code block) of Walsh code, and the retrieval of an idle Walsh code is performed by a unit of a code block. If one of the Walsh codes having one-Nth bit length of the maximum bit length in a code block is assigned, the code block becomes engaged.

Figure 2:
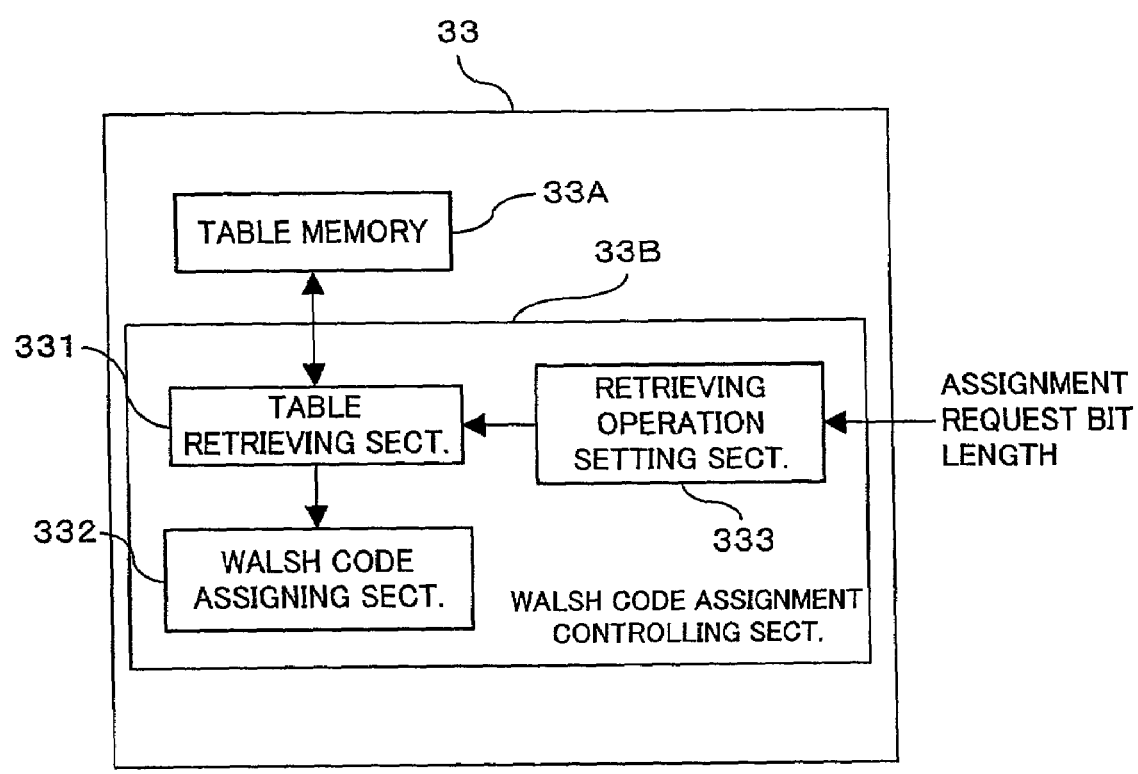
FIG. 2 is a block diagram schematically showing a Walsh-code/QOF managing section (a Walsh code assigning apparatus) in the CDMA communication system of FIG. 1.

It is impossible to perform efficient assignments of Walsh codes, and to minimize Walsh codes having smaller bit lengths cannot be assigned, with this assignment manner. To accomplish efficient assignment, the Walsh-code/QOF managing section 33, as shown in FIG. 2, includes a table memory 33A and a Walsh code assignment controlling unit 33B having a table retrieving section 331, a Walsh code assigning section 332, and a retrieving operation setting section 333.

The table memory (assignment order information retaining unit) 33A retains the assignment order table (assignment order information) 330. Assuming that the maximum bit length is 16 and the minimum bit length is 2, the order of assignment of Walsh codes from the front end in the assignment order table 330 of FIG. 3 is: "W0_16", "W8_16", "W4_16", "W12_16", "W2_16", "W10_16", "W6_16", "W14_16", "W1_16", "W9_16", "W5_16", "W13_16", "W3_16", "W1_16", "W7_16", "W15_16".

The Walsh codes (Wx_y) in FIG. 3 are represented by only the numbers (x) of the Walsh codes, however the bit lengths (y) of the Walsh codes are omitted. Walsh codes are represented in the same manner as FIG. 3 in other accompanying drawings. The Walsh codes in the assignment order table 330 are arranged in the same manner (the vertical direction) as the Walsh codes in FIGS. 18 and 19.

The table retrieving section 331 retrieves an idle Walsh code having a one-Nth bit length of the maximum bit length, for which an assignment request is issued, in every N Walsh code from the front end of the assignment order table 330 in order to obtain an idle Walsh code having an assignment request bit length that is to be assigned to a communication channel for which an assignment request is issued.

The Walsh code assigning section 332 assigns an idle Walsh code obtained by the table retrieving section 331 to the spreading code of a communication channel that issued an assignment request, and causes all Walsh codes in a code block that become unable to be orthogonally separated to be engaged (the occupied state) when assigning of the obtained idle Walsh code. The retrieving operation setting section 333 sets various conditions (a retrieve starting position, a unit of code block for retrieving, and so forth) to retrieve over the assignment order table 330 by the table retrieving section 331.

Figure 4:
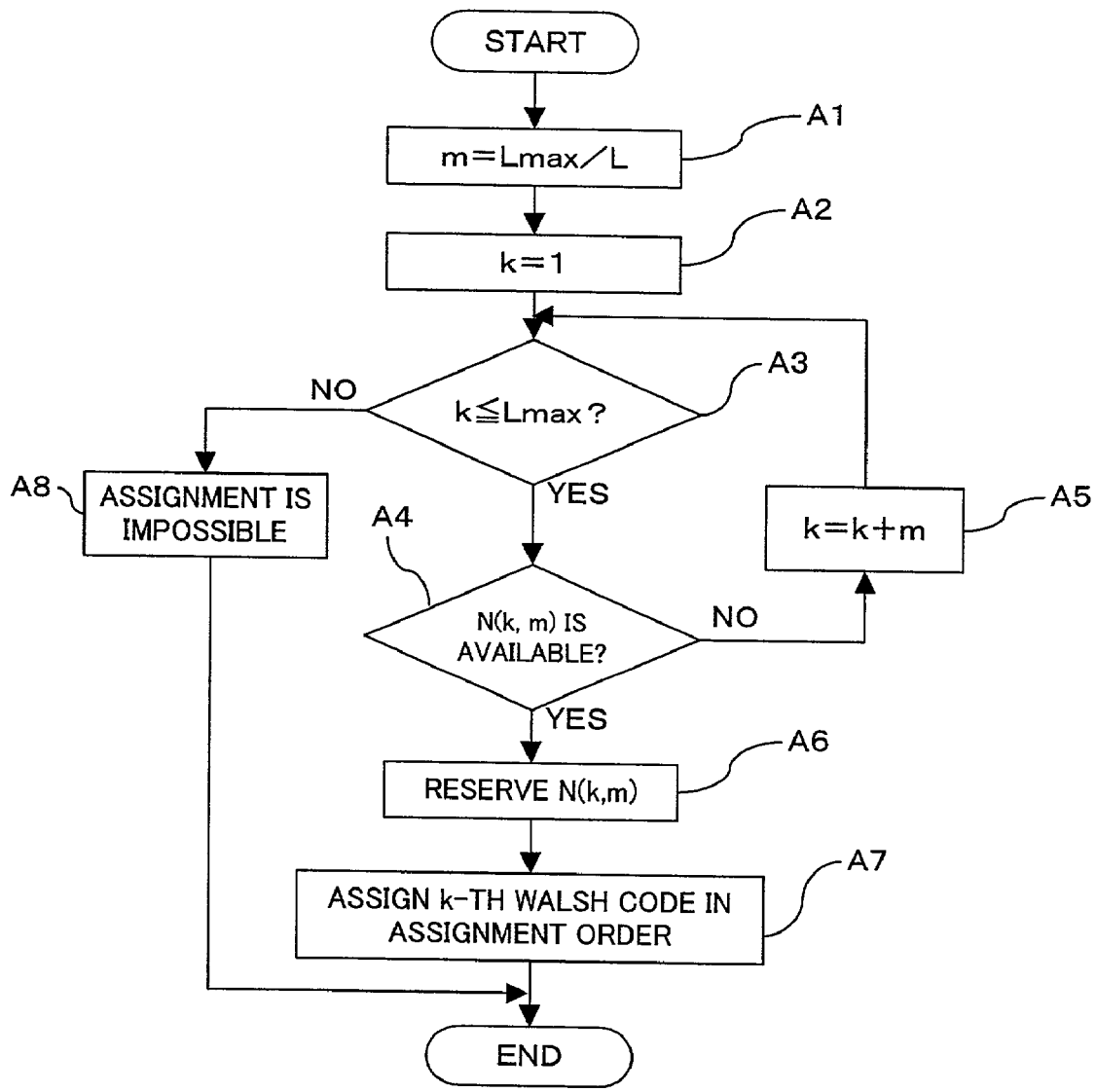
FIG. 4 is a flow diagram illustrating a succession of procedural steps (an algorithm) for assigning a Walsh code of the first embodiment.

The manner of assigning a Walsh code to the spreading code of a communication channel performed by the Walsh-code/QOF managing section (the Walsh code assiging apparatus) 33 of the first embodiment will now be described with reference to FIGS. 4 and 5A through 5D. In FIG. 4, "Lmax" is the maximum bit length of Walsh codes (Lmax=16 in FIGS. 5A through 5D); "L" is a bit length of a Walsh code for which a request for an assignment is issued (an assignment request bit length); "m" is the number of occupying channel codes (a unit of a retrieved block of Walsh codes); "k" is the number of the Walsh code in assignment order table 330; and "N(k, m)" is m Walsh codes (a code block consists of m Walsh codes) sequentially arranged from the Walsh code to be assigned in the k-th order.

First of all, the call controlling section 22 issues a request, which is caused by a call generation, for an assignment of a Walsh code to a particular channel (a request for an assignment of a Walsh code having an L-bit length). Upon receipt of the request, the retrieving operation setting section 333 sets the number m of occupying channel codes to "Lmax/L" (Step A1) and sets the number k of the Walsh code in the assignment order to "1" (i.e., the retrieve starting position is set to the front end of the assignment order table 330; Step A2).

The table retrieving section 331 retrieves an idle Walsh code from the front end (k=1) by a unit of m Walsh codes over the assignment order table 330 (Yes route in Step A3) in increments of m (k=k+m) (No route in Step A4 to Step A5) until the table retrieving section 331 finds a code block N(k, m) in which all m Walsh codes are idle (available) (Yes judgment in Step A4).

If an idle Walsh code (an idle code block) is found, the Walsh code assigning section 332 reserves the found code block N(k, m), in which all m Walsh codes are idle, (Yes route in Step A4 to Step A6), whereupon the k-th Walsh code in the assignment order table 330 is assigned to the spreading code of the communication channel for which the assignment request is issued (Step A7).

If no idle Walsh code having an L bit length is founded despite the retrieval throughout the assignment order table 330, the call controlling section is notified of the impossibility of the assignment (i.e., a blocking is occurred; No route in Step A3 to Step A8).

In this algorithm, if an assignment request bit length is 8 when the maximum bit length of Walsh codes is 16, an idle Walsh code is retrieved by every two Walsh codes (m=Lmax/L=16/8=2) from the front end of the assignment order table 330; if an assignment request bit length is 4, an idle Walsh code is retrieved by every four Walsh codes (m=Lmax/L =16/4=4) from the front end; if an assignment request bit length is 16 (the maximum bit length), an idle Walsh code is retrieved by every Walsh code (m=Lmax/L=16/16=1) from the front end; if an assignment request bit length is 2, an idle Walsh code is retrieved by every eight Walsh codes (m=Lmax/L=16/2=8) from the front end. Regarding the results of the respective retrievals, if idle Walsh codes are found, the found idle Walsh codes are assigned to the spreading codes of the respective channel for which assignment requests are issued and the code blocks N(k, m) respectively including the assigned Walsh codes are caused to become engaged (the occupied states).

For example, with all Walsh codes having respective bit lengths assigned to no spreading codes in the assignment order table 330, assuming assignment requests are issued in an order of assignment request bit lengths L of 8, 4, 16, 2. First of all, as shown in FIG. 5A, retrieval for a Walsh code having an 8-bit length is carried out by every two Walsh codes whereupon the first-found idle Walsh code "W0_16" (the first Walsh code (k=1) in the assignment order) is assigned to a spreading code and a code block N(1, 2) (a hatched part 41) including the Walsh code "W0_16" is made engaged (occupied).

In succession, as shown in FIG. 5B, retrieval for a Walsh code having a 4-bit length is carried out by every four Walsh codes, the first-found idle Walsh code "W2_16" (the fifth Walsh code (k=5) in the assignment order) is assigned to a spreading code and a code block N(5, 4) (a hatched part 42) including the Walsh code "W2_16" is caused to become engaged.

Similarly, as shown in FIG. 5C, retrieval for a Walsh code having a 16-bit length is carried out by every Walsh code, the first-found idle Walsh code "W4_16" (the third Walsh code (k=3) in the assignment order) is assigned to a spreading code and a code block N(3, 1) (a hatched part 43) including the Walsh code "W4_16" is caused to become engaged; for the last assignment request bit length, as shown in FIG. 5D, retrieval for a Walsh code having 2-bit length is carried out by every eight Walsh codes, the first-found idle Walsh code "W1_16" (the ninth Walsh code (k=9) in the assignment order) is assigned to a spreading code and a code block N(9, 8) (a hatched part 44) including the Walsh code "W1_16" is caused to become engaged.

Since retrieval for an idle Walsh code is executed over the assignment order table 330 by a unit of code block consisting of Walsh codes that become unable to be orthogonally separated due to one or more precedent assignments in the illustrated embodiment, the assignment of idle Walsh codes looks like crude patching up.

As opposed to the conventional technique, it is possible in the illustrated embodiment to greatly minimize the occurrence of a situation where assignments of Walsh codes having smaller bit lengths are failed although an adequate number of the idle Walsh codes having larger bit lengths are left caused by assigning Walsh codes arbitrarily. Especially, since code blocks consist of idle Walsh codes concentrated on the rear part of the assignment order table 330 because of a concentration of assigned Walsh codes in the forward part, it is possible to enhance the assignment rate of Walsh codes having smaller bit lengths, which Walsh codes are for communication channels having high data rates. In other words, it is possible to reduce the call blocking probability.

Figure 6:
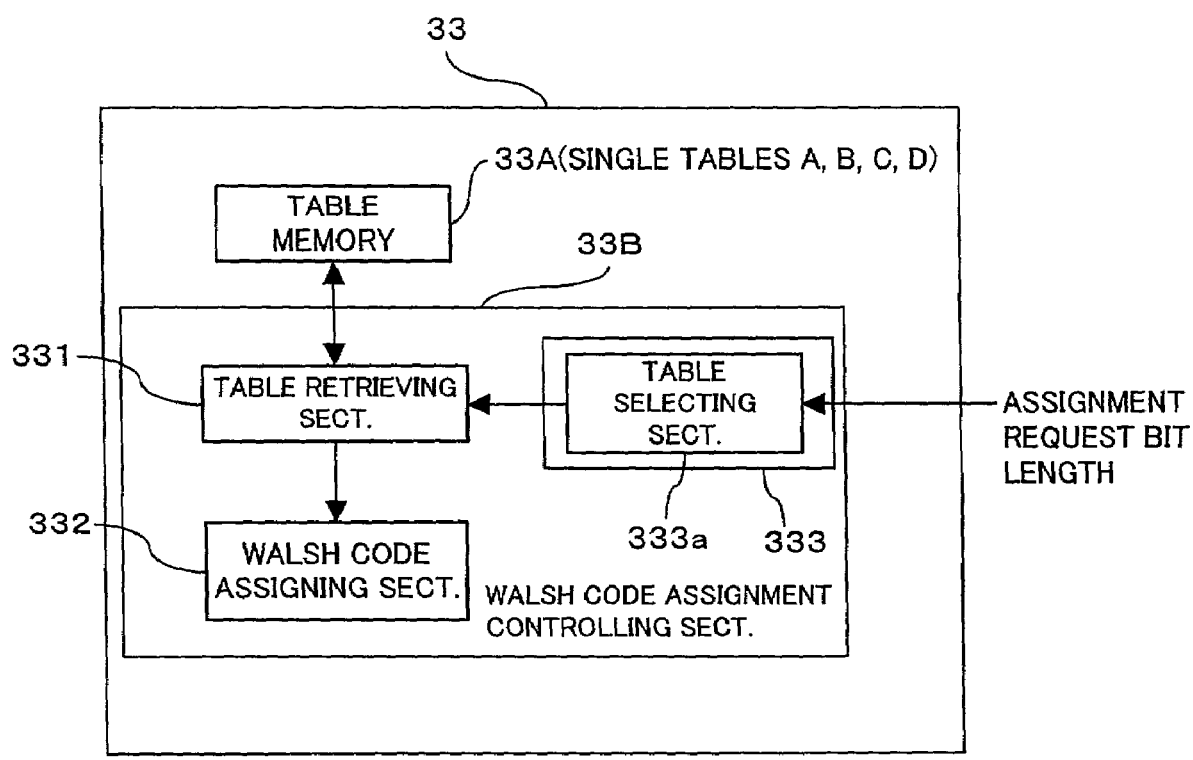
FIG. 6 is a block diagram similar to FIG. 2, but schematically showing a first modification of a Walsh-code/QOF managing section (a Walsh code assigning apparatus) of the first embodiment.

(B) First Modification:

FIG. 6 is a block diagram similar to FIG. 2, but schematically showing a first modification of a Walsh-code/QOF managing section (a Walsh code assigning apparatus) 33 of the first embodiment. As compared with the Walsh codes assigning apparatus of FIG. 2, the apparatus of FIG. 6 comprises four tables A through D (hereinafter also called single tables) as shown in FIGS. 7A through 7D, which respectively represent assignment orders of Walsh codes having respective bit lengths, in the table memory 33A, and a table selecting section 333a in the retrieving operation setting section 333 of the Walsh code assignment controlling unit 33B. Like reference numbers designate identical parts or elements with the first embodiment as long as no further explanation is made.

The single table A retains the assignment order information of Walsh codes having a 16-bit length; the single table B retains the assignment order information of Walsh codes having an 8-bit length; the single table C retains the assignment order information of Walsh codes having a 4-bit length; and the single table D retains the assignment order information of Walsh codes having a 2-bit length.

In FIGS. 7A through 7D, it is assumed that the maximum bit length (Lmax) of Walsh codes is 16. The assignment orders in the respective single tables A through D may be changed on the individual single table basis.

The table selecting section 333a selects a table corresponding to an assignment request bit length (L) among the single tables A through D in order to serve the selected table for the retrieval performed by the table retrieving section 331.

In the first modification, the respective assignment orders in the single A through D are set so as not to coincide with each other, and the table retrieving section 331 retrieves idle Walsh codes in line with the assignment orders of the corresponding bit lengths over each single table A through D. In this case, the retrieving section 331 executes the retrieval throughout a selected single table A, B, C or D.

Setting four single tables A through D is equal to setting retrieve starting positions of respective bit lengths, which positions are used for retrieval performed by the table retrieving section 331 in the assignment order table 330 described with reference to FIG. 3. The retrieving operation setting section 333 of FIG. 6 serves as a position setting section for setting retrieve starting positions for the respective bit lengths, which starting positions are used for the retrievals of idle Walsh codes having assignment request bit lengths over the assignment order information retained in the table memory 33A. Therefore, the table retrieving section 331 starts retrieving an idle Walsh code from the retrieve starting position, which has been set by the retrieving operation setting section 333 and which corresponds to an assignment request bit length L.

Figure 8:
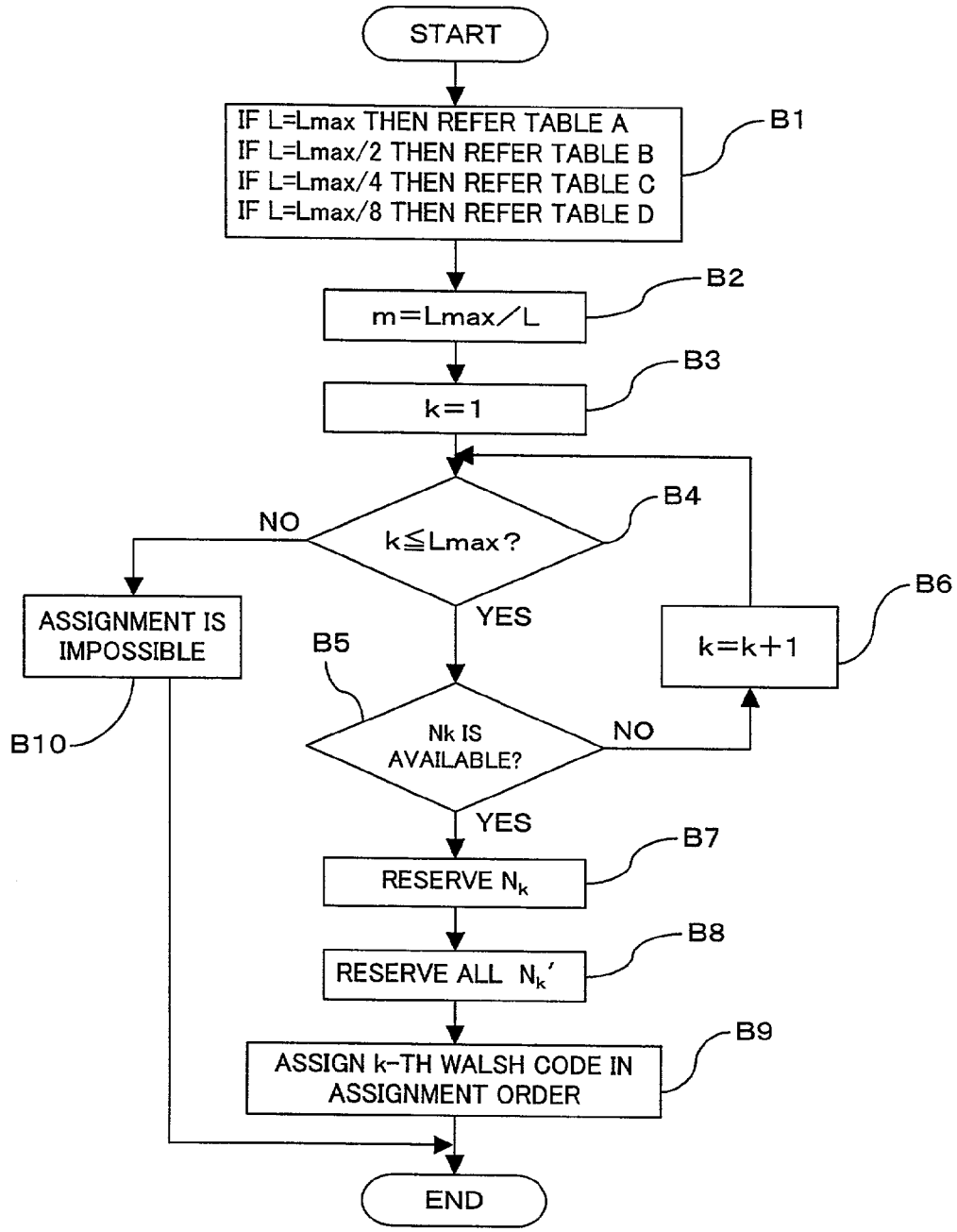
FIG. 8 is a flow diagram similar to FIG. 4, but illustrating a succession of procedural steps (an algorithm) for assigning a Walsh code of the first modification.

The manner of assigning a Walsh code to the spreading code of a communication channel of the first modification will now be described. Upon issuing a request for assigning a Walsh code to a spreading channel, the table selecting section 333a selects one table corresponding to an assignment request bit length L among the single tables A through D (Step B1) in the Walsh code assignment controlling unit 33B, as shown in FIG. 8. The selected single table is used for retrieval by the table retrieving section 331.

In succession, the retrieving operation setting section 333 sets the number m of occupying channel codes to "Lmax/L" (Step B2) and sets the number k in the assignment order to "1" (i.e., the retrieve starting position is set to the front end in the selected single table; Step B3).

The table retrieving section 331 retrieves an idle Walsh code over the selected single table from the front end (k=1) by every Walsh code (Yes route in Step B4) in increments of 1 (k=k+1) (No route in Step B5 to Step B6) until the table retrieving section 331 finds an idle Walsh code (Yes judgment in Step B5).

When an idle Walsh code is found, the Walsh code assigning section 332 reserves the found idle Walsh code $N_k$ that is a Walsh code to be assigned in the k-th order in the assignment order of the referring single table (Yes route in Step B5 to Step B7). Further, the Walsh code assigning section 332 reserves all the Walsh codes $N_k'$ in the other tables (Step B8), which Walsh codes become unable to be assigned by the assignment of the Walsh code $N_k$ whereupon the Walsh code $N_k$ is assigned to the spreading code of the communication channel for which a request for an assignment is issued (Step B9).

If an idle Walsh code having the assignment request bit length L is not found despite the retrieval throughout the selected single table, the call controlling section 22 is notified of the impossibility of the assignment (i.e., a blocking occurs; No route in Step B4 to Step B10).

As mentioned above, since the retrieval for an idle Walsh code is executed with respect to an individual assignment bit length, the assigned Walsh codes do not concentrate in a particular area (code block) but disperse over the table memory 33A. Since the retrieval with respect to all assignment request bit lengths can be performed by the retrieval by every Walsh code in the respective corresponding table, it is possible to simplify the retrieving. Therefore, in addition to the advantageous results of the first embodiment, it is possible to reduce the retrieval loop count. This means that it is possible to realize a high-speed assignment of Walsh codes since the time for finding an idle Walsh code is reduced. It is also possible to arbitrarily change the assignment orders in the respective single tables A through D to other assignment orders.

Figure 9:
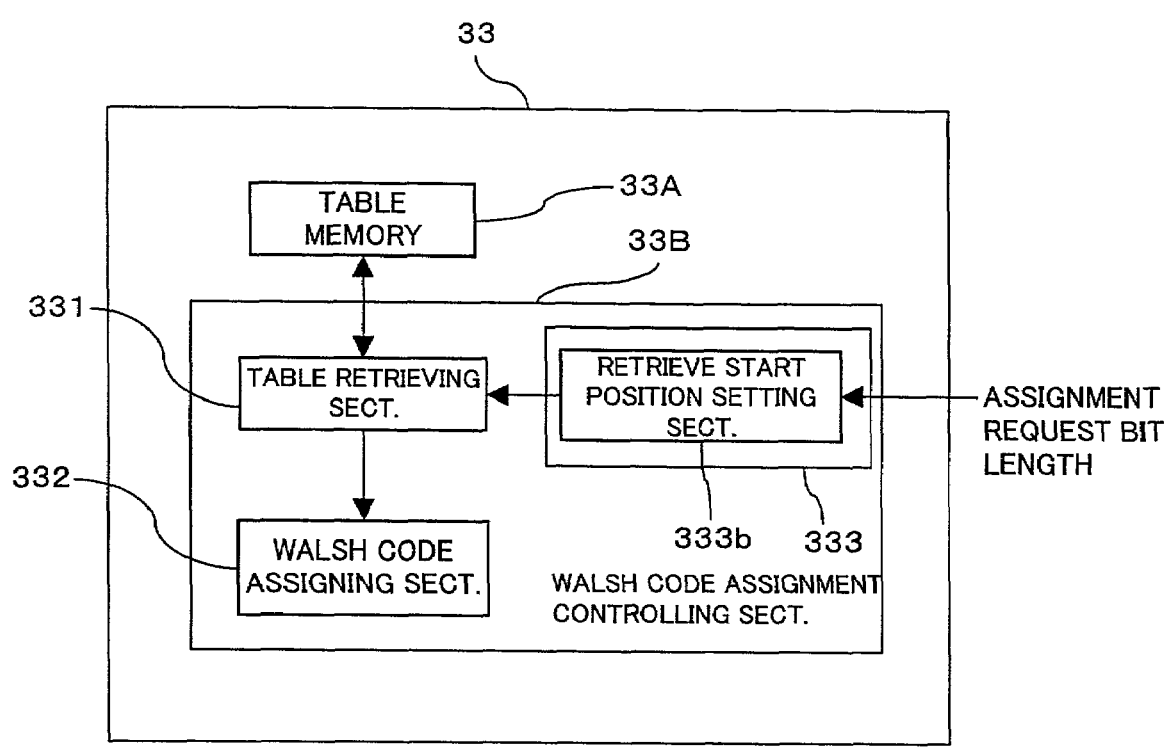
FIG. 9 is a block diagram similar to FIG. 2, but schematically showing a second modification of a Walsh-code/QOF managing section (a Walsh code managing apparatus) of the first embodiment.

(C) Second Modification:

FIG. 9 is a block diagram similar to FIG. 2, but schematically showing a second modification of a Walsh-code/QOF managing section (a Walsh code assigning apparatus) 33 of the first embodiment. As compared with the Walsh code assigning apparatus of FIG. 2, the apparatus of FIG. 9, additionally comprises a retrieve starting position setting section 333b in the retrieving operation setting section 333 of the Walsh code assignment controlling unit 33B. Like reference numbers designate identical parts or elements with the foregoing examples as long as no further explanation is made.

The retrieve starting position setting section 333b sets, in the assignment order table 330 of FIG. 3, a retrieve starting position kn (n=1 through Lmax/Lmin) with respect to the individual bit length of Walsh codes. In the illustrated modification, the parameters kn define the retrieve starting positions identical with those in the single tables A through D in the first modification.

Figure 10:
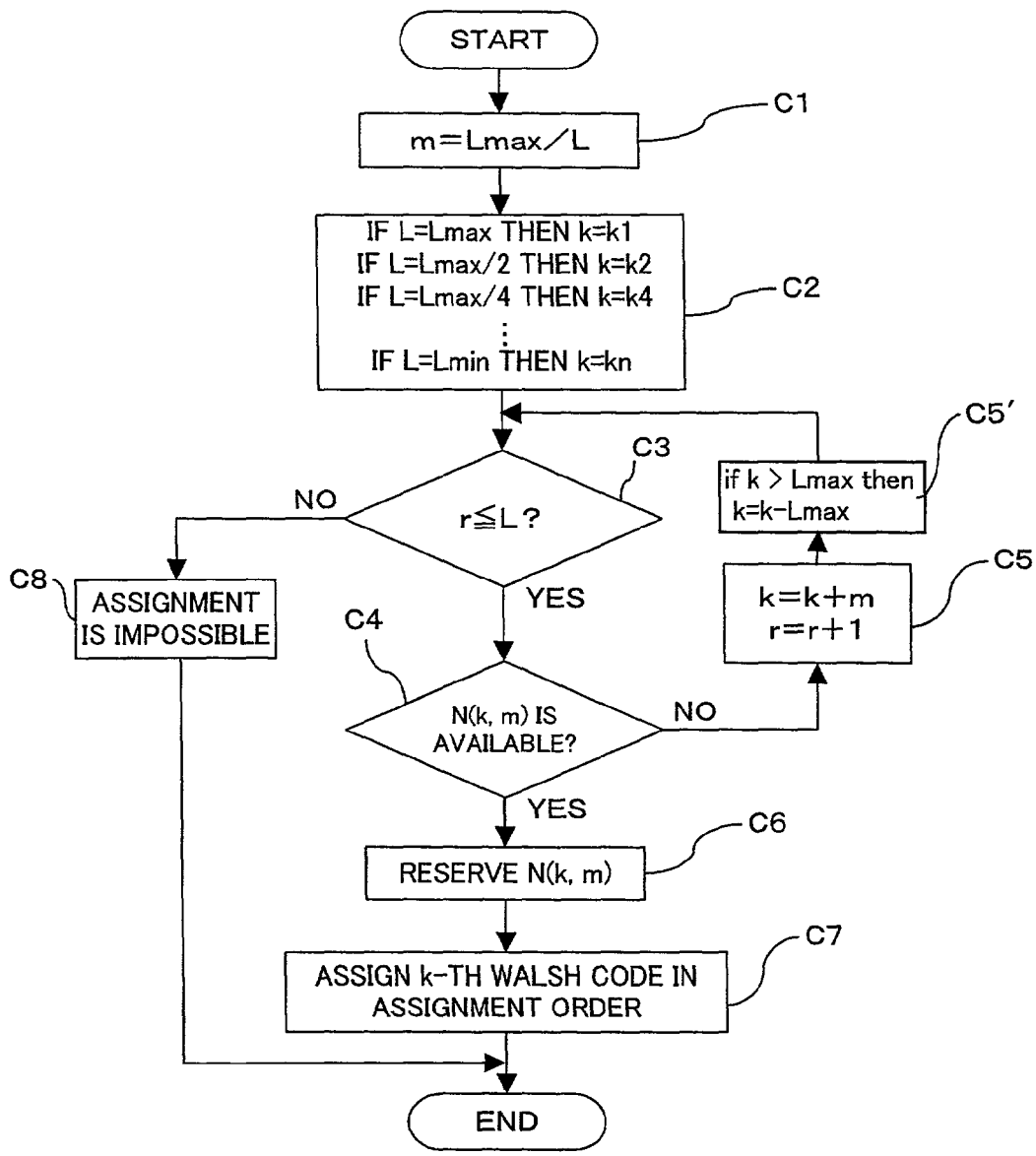
FIG. 10 is a flow diagram similar to FIG. 4, but illustrating a succession of procedural steps (an algorithm) for assigning a Walsh code of the second modification.

The manner of assigning a Walsh code to the spreading code of a communication channel of the second modification will now be described with reference to flow diagram FIG. 10. In FIG. 10, the symbol "r" is a retrieval loop count. Other parameters or symbols in the figure are identical to those described in FIGS. 4 and 8.

First of all, the call controlling section 22 issues an assignment request, caused by a call generation, for an assignment request bit length L the retrieving operation setting section 333 sets the number m of occupying channel codes to "Lmax/L" (Step C1) and sets the retrieval loop count r to "1". At that time, the retrieve starting position setting section 333b sets the k-th Walsh code in the assignment order table 330 to the retrieve starting position kn corresponding to an assignment request bit length L (Step C2).

The table retrieving section 331 retrieves an idle Walsh code in the assignment order table 330 from the set retrieve starting position kn by every m Walsh code(Yes route in Step C3) in increments of m (k=k+m) in the number k of the assignment order and in increments of 1 (r=r+1) in the retrieval loop count r (No route in Step C4 to Step C5) until the table retrieving section 331 finds, in the assignment order table 330, a code block N(k, m) in which m Walsh codes sequentially arranged from the k-th assignment order are all idle (available)(Yes judgment in Step C4).

If the number k of the assignment order becomes larger than Lmax (L>Lmax) as the increments m in the number k of the assignment order, the table retrieving section 331 returns the number k to the number within the assignment order in the assignment order table 330 by the subtraction k=k-Lmax (Step C5') whereupon the retrieval of an idle Walsh code (an idle code block) is continued.

When an idle Walsh code is found, the Walsh code assigning section 332 reserves the code block N(k, m) including the Walsh code found idle (Yes route in Step C4 to Step C6), and assigns (Step C7) the found Walsh code that is the k-th in the assignment order to the spreading code of the communication channel for which the assignment request is issued.

As in the above-mentioned cases, if an idle Walsh code having the assignment request bit length L is not found despite the retrieval throughout the assignment order table 330, the call controlling section 22 is notified of the impossibility of the assignment (i.e., a blocking occurs; No route in Step C3 to Step C8).

In this second modification, since the retrieval starting positions are set for the respective bit lengths of the Walsh codes in the assignment order table 330 to execute the retrieval and the following assignment of an idle Walsh code, the assigned Walsh codes do not concentrate in a particular area (code block) but disperse over the assignment order table 330.

In addition to the advantageous result of the first embodiment, it is possible to realize high-speed assignment of Walsh code due to the smaller retrieval loop counts, as compared with the first embodiment (in which the retrieval always starts at the front end of the assignment order table 330). Further, since each retrieve starting position is defined by a single parameter (kn), it is possible to simplify the assignment process using a single assignment order table (i.e., it is not necessary for a large-capacity memory).

Figure 11:
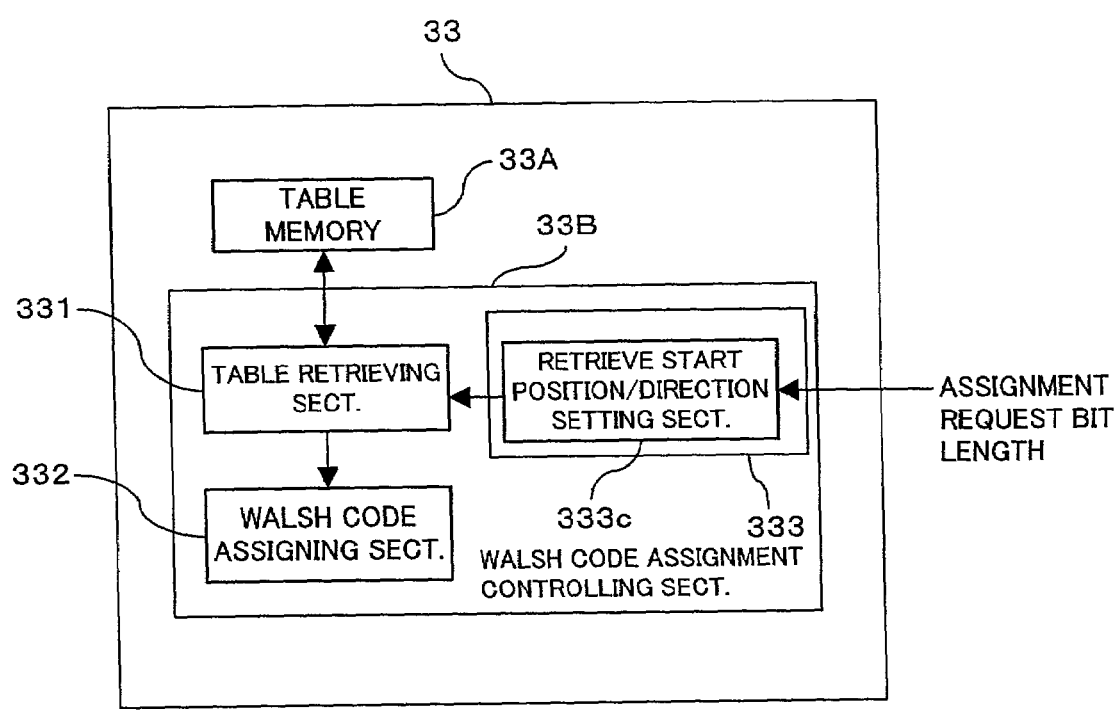
FIG. 11 is a block diagram similar to FIG. 2, but schematically showing a third modification of a Walsh-code/QOF managing section (a Walsh code assigning apparatus) of the first embodiment.

(D) Third Modification:

FIG. 11 is a block diagram similar to FIG. 2, but schematically showing a third modification of a Walsh-code/QOF managing section (a Walsh code assigning apparatus) 33 of the first embodiment. As compared with the Walsh code assigning apparatus of FIG. 2, the apparatus of FIG. 11 further comprises a retrieve starting position/direction setting section 333c in the retrieving operation setting section 333 of the Walsh code assignment controlling unit 33B. Like reference numbers designate identical parts or elements with the foregoing examples as long as no further explanation is made.

The retrieve starting position/direction setting section 333c sets retrieval starting positions for the respective bit lengths of the Walsh codes in the assignment order table 330, as the retrieve starting position setting section 333b in the second modification, and also sets retrieve directions (forward/backward) for the respective bit lengths. After the retrieve starting positions and retrieve directions are set by the retrieve starting position/direction setting section 333c, the table retrieving section 331 retrieves an idle Walsh code (an idle code block) over the assignment order table 330 in accordance with the set retrieve starting positions and the retrieve directions.

Figure 12:
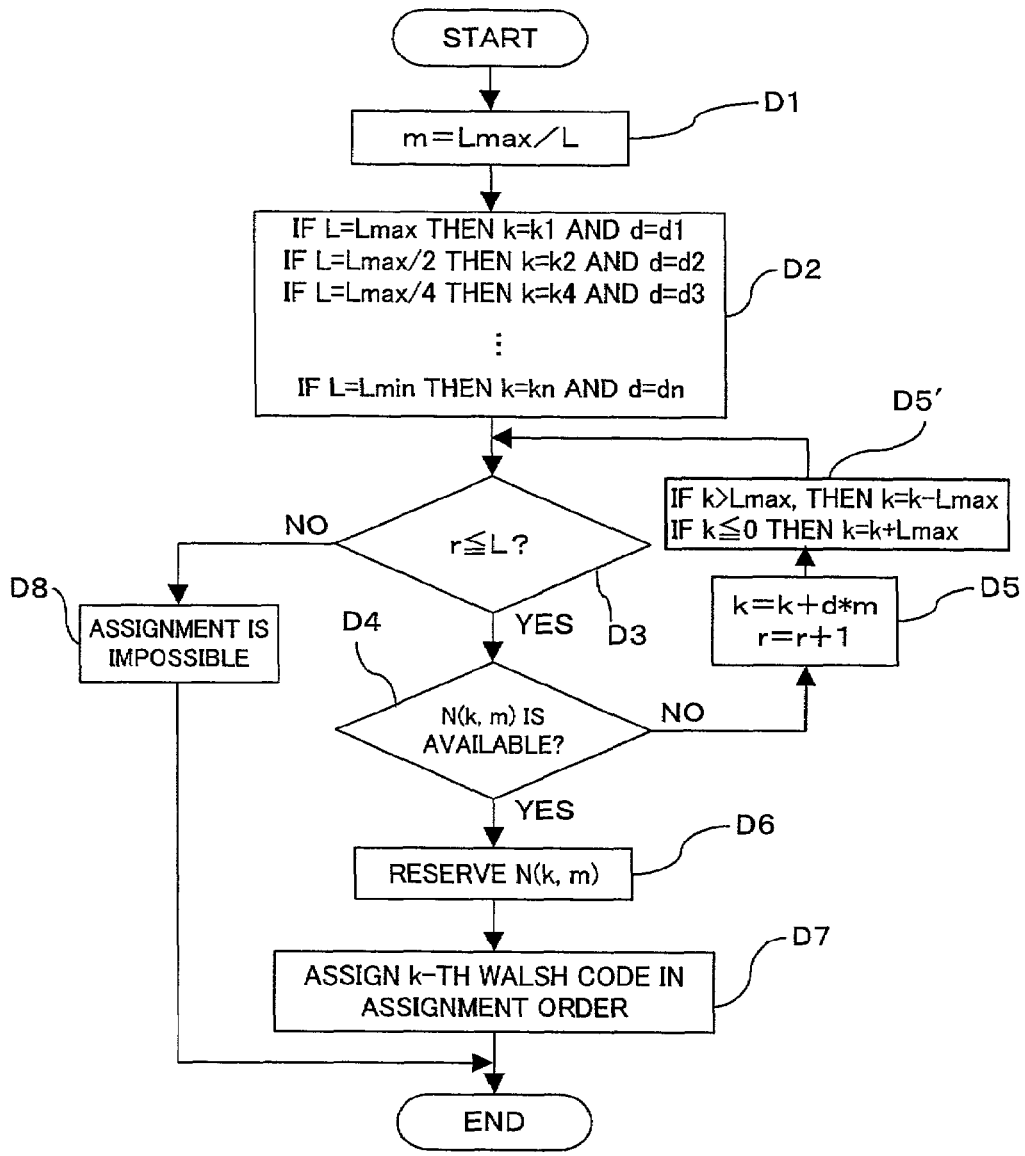
FIG. 12 is a flow diagram similar to FIG. 4, but illustrating a succession of procedural steps (an algorithm) for assigning a Walsh code of the third modification.

The manner of assigning a Walsh code to the spreading code of a communication channel of the third modification will now be described with reference to a flow diagram of FIG. 12. In FIG. 12, the symbol "d" is the direction of the retrieval for individual bit length of the Walsh codes (dn=+1: forward direction; and dn=-1: backward direction). Other parameters or symbols in the figure are identical to those described in FIGS. 4, 8 and 10.

First of all, the call controlling section 22 issues an assignment request caused by a call generation for an assignment request bit length L, the retrieving operation setting section 333 sets the number m of occupying channel codes to "Lmax/L" (Step D1) and sets the retrieval loop count r to "1". The retrieve starting position/direction setting section 333c sets the retrieve starting position k and the retrieve direction d to kn and dn which correspond to the assignment request bit length L respectively (Step D2).

The table retrieving section 331 retrieves an idle Walsh code over the assignment order table 330 from the set retrieve starting position kn by every m Walsh code in increments of m (k=k+m) or by decrements of m (k=k-m) in the number k of the assignment order and increments of the number in increments of 1 (r=r+1) in the retrieval loop count r (Yes route in Step D3 and No route in Step D4 to Step D5) until the table retrieving section 331 finds, in the assignment order table 330, a code block N(k, m) in which m Walsh codes sequentially arranged from the k-th assignment order are all idle (available)(Yes judgment in Step D4).

If the number k of the assignment order becomes larger than Lmax (k>Lmax) as the increments m in the assignment order k, the table retrieving section 331 returns the number k to the number within the assignment order in the assignment table 330 by the subtraction k=k-Lmax (Step D5') whereupon the retrieval of an idle Walsh code (an idle code block) is continued. In the same way, if the number k of the assignment order becomes equal to or smaller than zero (k≦0) as decrements m in the assignment order k, the table retrieving section 331 returns the number k to the number within the assignment order in the assignment order table 330 by the addition k=k+Lmax (Step D5') whereupon the retrieval of an idle Walsh code (a code block) is continued.

When an idle Walsh code (an idle code block) is found, the Walsh code assigning section 332 reserves the found code block N(k, m), in which all m Walsh codes are idle (Yes route in Step D4 to Step D6), whereupon the k-th Walsh code in the assignment order table 330 is assigned to the spreading code of the communication channel for which the assignment request is issued (Step D7).

If no idle Walsh code having an L-bit length is founded despite the retrieval throughout the assignment order table 330, the call controlling section is notified of the impossibility of the assignment (i.e., a blocking occurs; No route in Step D3 to Step D8).

As mentioned above, the retrieve starting positions in the assignment order table 330 and the retrieve directions (forward/backward) are set for the respective bit lengths of the Walsh codes, and the retrieval for an idle Walsh code is continued throughout the assignment order table 330 in accordance with the set retrieve starting position and the set retrieve direction until a Walsh code capable of being assigned is found, in the illustrated modification. In addition to the advantageous result of the first embodiment, the assigned Walsh codes do not concentrate in a particular area (code block) but disperse over the assignment order table 330. In particular, partly since the assignment can be realized by the reduced retrieval loop count r, and partly since the assignment orders can be set to differentiate each other due to an increased amount of combinations of the parameters for the retrieval order, the assignment manner of the illustrated modification can deal with Walsh codes having a large number of bit lengths.

In the illustrated modification, when the retrieve direction d is fixed at "+1", the algorithm of the third modification is identical with that of the second modification described with reference to FIG. 10; when the retrieve starting position kn and the retrieve direction d are respectively fixed at "1" and "+1", the algorithm of the third modification is identical with that of the first embodiment described with reference to FIG. 4.

(E) Fourth Modification:

Here, in a system in which Walsh codes are used as spreading codes for discriminating communication channels, such as the IS-2000 system, the communication channels are loosely classified into two kinds; one occupies spreading codes for a long time; and the other occupies spreading codes for a short time to frequently assign and discharge spreading codes one after another. In the IS-2000 system, the former kind that occupies spreading codes for a long time includes a shared channel that is shared by the plural terminals 2 as, for example, a control channel, a traffic channel for single low-speed data communication (including packets and circuit; hereinafter also called the low-speed data communication channel) and so on (see FIG. 15). On the other hand, the latter kind that occupies spreading codes for a short time includes a traffic channel for single voice communication (a connection during voice communication; hereinafter also called the "voice channel"), a traffic channel for single high-speed packet data communication (a connection during only data communication; hereinafter also called the "high-speed data communication channel") and so forth.

In the fourth modification, the assignment order table 330 that includes 128 Walsh codes is divided (grouped) into four areas A through D, as shown in FIG. 14. The retrieve starting areas of the respective types of the above-mentioned communication channel (hereinafter such types are called the "channel types" or the "assigning code types") are allocated to each of the areas A through D. In this case, the individual channel type is defined in terms of the length of estimated time periods during which the respective communication channels occupy the individual Walsh codes.

Specifically, as shown in an example assignment order #1 of FIG. 15, the retrieval of an idle Walsh code for the shared channel is performed in the order of areas A, B, C, D; the retrieval for the low-speed data communication channel, in the order of areas B, C, D, A; the retrieval for the voice channel, in the order of areas C, D, A, B; and the retrieval for the high-speed communication channel, in the order of areas D, A, B, C.

Figure 13:
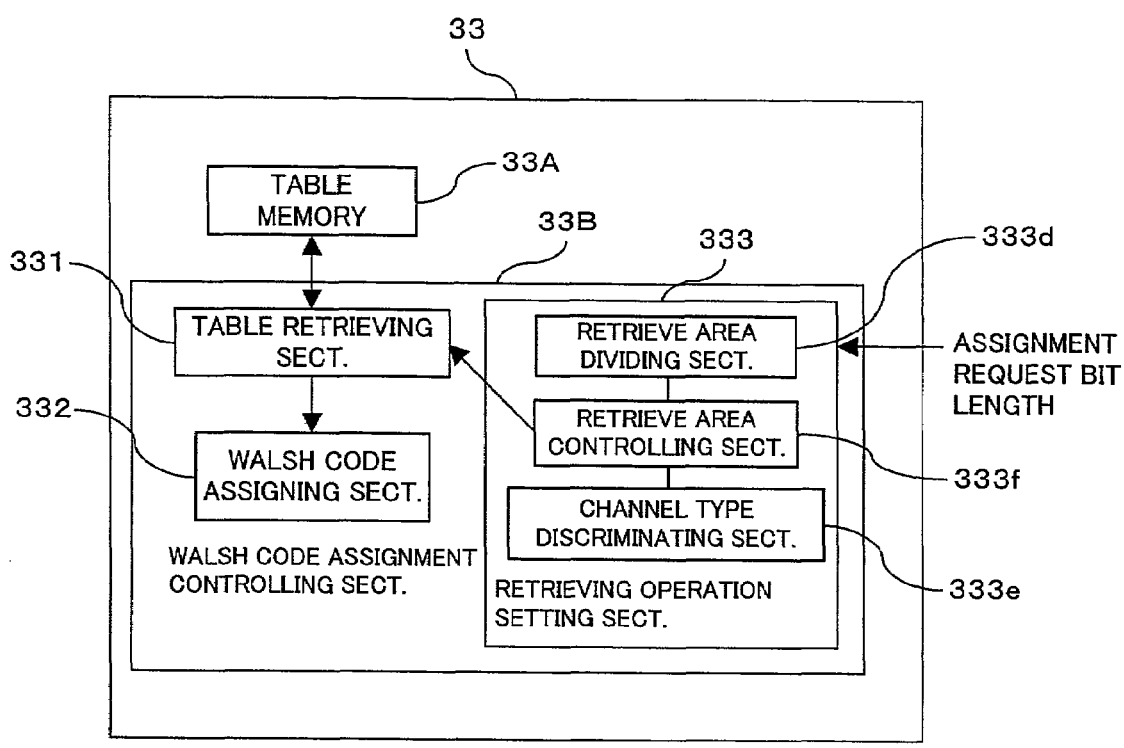
FIG. 13 is a block diagram similar to FIG. 2, but schematically showing a fourth modification of a Walsh-code/QOF managing section (a Walsh code assigning apparatus) of the first embodiment.

To realize the allocating of the respective retrieve starring areas, the retrieving operation setting section 333, as shown in FIG. 13, includes a retrieve area dividing section 333*d* for dividing the assignment order table 330 into a plurality of areas (the areas A through D), a channel type discriminating section 333*e* for discriminating a channel type to which a generated call is allocated (discriminating lengths of estimated time periods during which a channel occupies a Walsh code), and a retrieve area controlling section 333*f* for performing area control by allocating one of the divided areas (the areas A through D) as a retrieve starting area for the retrieval of an idle Walsh code carried out by the table retrieving section 331 with respect to an individual channel type discriminated by the channel type discriminating section. 333*e*.

The retrieve area controlling section 333*f* respectively allocates each channel type to the respective different retrieve starting areas (area retrieve orders). The allocated area retrieve orders allow partial overlaps. The manner (algorithm) of retrieval over the respective areas A through D is performed in any one of the manners described in the foregoing embodiment and modifications with reference to FIGS. 4, 8, 10, and 12.

As a result, the assigned Walsh codes in the assignment order table 330 do not concentrate in a particular area (for example, one of the areas A through D) but disperse over all areas A through D. In other words, the assignment order table 330 has two kinds of fields: one field in which Walsh codes are frequently assigned to and discharged channels one after another in short terms; and the other field in which Walsh codes are assigned to identical channels for a relatively long time. Therefore, in addition to the advantageous result of the foregoing examples, it is possible to reduce the call blocking probability due to success in the assignment at a high rate.

As an alternative, the channel types may be defined in terms of priorities among the communication channels or data rates (i.e., the bit lengths of Walsh codes that are to be assigned) of the respective communication channels.

When the type of the communication channel depends on the priorities, emergency calls by 9-1-1 should take higher priority over the channels for ordinary voice communication and high-speed data communication channel or the like. It is possible to allocate the channel types defined in terms of the priorities to different retrieve starting areas, as shown in an example of the assignment order #1 of FIG. 16. Since the manner of defining the channel types increases the rate for success in assignments of Walsh codes to the priority (emergency) calls, it is possible to minimize blocking for emergency calls.

When the channel types depend on the data rates, it is possible to allocate the communication channels having the respective data rates to the different retrieve starting areas (an example assignment order #1 in FIG. 17). Since the assigned Walsh codes that are assigned to the individual data rate do not disperse over the assignment order table over the areas corresponding to the data rates 330 with respect to the individual data rate, it is possible to reduce blocking for calls having a particular data rate.

In cases when the channel types are defined in terms of the length of estimated occupying time period, the priorities, and the data rates, the retrievals should by no means be limited to being performed throughout all areas A through D. As an alternative, the retrievals may be performed over some of the areas (hereinafter also called limited retrieve area). For example, as shown in examples assignment order #2 of FIGS. 15 and 16, the retrieval with respect to the individual channel may be performed over only one area: retrieving over only the area A for the shared channel; retrieving over only the area B for the low-speed data communication channel or the emergency calls; retrieving over only the area C for the voice channel; and retrieving over only area D for the high-speed data communication channel. Further, the retrieval with respect to the individual channel may be performed over some areas: retrieving over areas A through B for the shared channel; and retrieving over areas B through D for the low-speed data communication.

Similarly, when the retrieval area is set in terms of the data rates, the retrieval of a Walsh code with respect to the individual data rate may be performed over only one or some of the areas A through D, as shown in an example assignment order #2 of FIG. 17.

The retrieve area controlling section 333$f$ realizes a retrieval area control by allocating at least one area as the retrieve area to the individual channel type. Since the retrievals of idle codes for the individual channel types do not affect each other because of the respective limited retrieve area for the individual channel type (defined in terms of the length of estimated occupying time period, the priorities, and the data rates), it is possible to guarantee an adequate number of Walsh codes that can be assigned for each channel type.

When the limited retrieve areas are defined in terms of respective data rates, it is possible to set the proper number of channels by demand. For example, assignments of more than thirty voice communication channels and at least one data communication channel of 144.4 kbps (kilobits per second) may be ensured.

Conversely, since the table retrieve section 331 retrieves an idle Walsh code throughout the assignment order table 330 when the retrievals are performed without setting the limited retrieve areas, it is possible to assign a Walsh code to a spreading code as long as one or more Walsh codes are left in the table 330.

In this modification, the assignment order table 330 is divided into the plural areas A through D. As an alternative, the area A through D may be in the form of respective dedicated tables that include identical information in common with the assignment order table 330.

(F) Others:

Throughout this description, the present invention is adapted to a CDMA system of the IS-2000. The present invention should, of course, by no means be limited to a CDMA system of the IS-2000. As an alternative, the present invention can be applied also to a system requirement to assign Walsh codes having different bit lengths to the spreading codes of communication channels, guaranteeing the same advantageous results.

Further, the present invention should by no means be limited to this foregoing embodiment and these modifications, and various changes or other modifications may be suggested without departing from the gist of the invention.

What is claimed is:

1. A method for assigning a plurality of Walsh codes having different bit lengths to respective spreading codes of a plurality of communication channels, said method comprising the steps of:

setting assignment order information about an order of assignment of the plurality of Walsh codes of different bit lengths such that one Walsh code having a smaller bit length becomes unable to be orthogonally separated as being precedent over another Walsh code having a larger bit length;

retrieving, over the plurality of Walsh codes, an idle Walsh code which is not assigned to any spreading code in accordance with the set assignment order information, said idle Walsh code having an assignment request bit length to be assigned to a communication channel for which an assignment request is issued;

assigning the retrieved idle Walsh code to the spreading code of the communication channel for which the assignment request is issued; and setting a plurality of retrieve starting positions for the respective bit lengths of the plurality of Walsh codes so that, in said retrieving step, retrieving of the idle Walsh code starts at the set retrieve starting position corresponding to the respective assignment request bit length.

2. A method according to claim 1, further comprising the steps of:

dividing the assignment order in the set assignment order information into a plurality of groups;

allocating one of the plural groups as a retrieve starting group for said retrieving in said retrieving step with respect to an individual type of the plural communication channels.

3. A method according to claim 2, wherein, in said retrieving step individual types of the plurality of communication channels respectively have different retrieve starting groups.

4. A method according to claim 2, wherein, in the retrieving step, said retrieving of the idle Walsh code with respect to the individual type of the plurality of communication channels is carried out over a part of the plural groups.

5. A method according to claim 2, wherein the individual type of the plural communication channels is defined in terms of lengths of estimated time periods during which respective communication channels occupy individual Walsh codes.

6. A method according to claim 2, wherein the individual type of the plurality communication channels is defined in terms of priorities among the plurality of communication channels.

7. A method according to claim 2, wherein the individual type of the plural communication channels is defined in terms of data rates of respective communication channels.

8. A method for assigning a plurality of Walsh codes having different bit lengths to respective spreading codes of a plurality of communication channels, said method comprising the steps of:

setting assignment order information about an order of assignment of the plurality of Walsh codes of different bit lengths such that one Walsh code having a smaller bit length becomes unable to be orthogonally separated as being precedent over another Walsh code having a larger bit length;

retrieving, over the plurality of Walsh codes, an idle Walsh code which is not assigned to any spreading code in accordance with the set assignment order information, said idle Walsh code having an assignment request bit length to be assigned to a communication channel for which an assignment request is issued;

assigning the retrieved idle Walsh code to the spreading code of the communication channel for which the assignment request is issued; and setting a plurality of retrieve starting positions and retrieve directions for the respective bit lengths of the plurality of Walsh codes so that, in said retrieving step, retrieving of the idle Walsh code starts at the set retrieve starting position in the set retrieve direction which correspond to the assignment request bit length.

9. A method according to claim 8, further comprising the steps of:

dividing the assignment order in the set assignment order information into a plurality of groups;

allocating one of the plurality of groups as a retrieve starting group for said retrieving in said retrieving step with respect to an individual type of the plurality of communication channels.

10. A method according to claim 9, wherein, in said retrieving step, the individual types of the plurality of communication channels respectively have different retrieve starting groups.

11. A method according to claim 9, wherein, in said retrieving step, said retrieving of the idle Walsh code with respect to a the individual type of the plurality of communication channels is carried out over a part of the plurality of groups.

12. A method according to claim 9, wherein the individual type of the plural communication channels is defined in terms of lengths of estimated time periods during which respective communication channels occupy individual Walsh codes.

13. A method according to claim 9, wherein the individual type of the plurality of communication channels is defined in terms of priorities among the plurality of communication channels.

14. A method according to claim 9, wherein the individual type of the plurality of communication channels is defined in terms of data rates of respective communication channels.

15. A method for assigning a plurality of Walsh codes having different bit lengths to respective spreading codes of a plurality of communication channels, said method comprising the steps of:

setting assignment order information about an order of assignment of the plural Walsh codes of different bit lengths such that one Walsh code having a smaller bit length becomes unable to be orthogonally separated as being precedent over another Walsh code having a larger bit length;

retrieving, over the plural Walsh codes, an idle Walsh code which is not assigned to any spreading code in accordance with the set assignment order information, said idle Walsh code having an assignment request bit length to be assigned to a communication channel for which an assignment request is issued;

assigning the retrieved idle Walsh code to the spreading code of the communication channel for which the assignment request is issued;

dividing the assignment order in the set assignment order information into a plurality of groups; and allocating one of the plurality of groups as a retrieve starting group for said retrieving in said retrieving step with respect to an individual type of the plurality of communication channels.

16. A method according to claim 15, wherein, in said retrieving step, the individual types of the plurality of communication channels respectively have different retrieve starting groups.

17. A method according to claim 15, wherein, in said retrieving step, said retrieving of an individual idle Walsh code with respect to the individual type of the plurality of communication channels is carried out over a part of the plurality of groups.

18. A method according to claim 15, wherein the individual type of the plurality of communication channels is defined in terms of lengths of estimated time periods during which respective communication channels occupy individual Walsh codes.

19. A method according to claim 15, wherein the individual type of the plurality of communication channels is defined in terms of priorities among the plurality of communication channels.

20. A method according to claim 15, wherein the individual type of the plurality of communication channels is defined in terms of data rates of respective communication channels.

21. An apparatus for assigning a plurality of Walsh codes having different bit lengths to respective spreading codes of a plurality of communication channels, said apparatus comprising:

retaining means for retaining assignment order information about an order of assignment of the plurality of Walsh codes such that one Walsh code having a smaller bit length becomes unable to be orthogonally separated as being precedent over another Walsh code having a larger bit length; and controlling means for controlling Walsh code assignment, said controlling means including:

retrieving means for retrieving, among the plurality of Walsh codes, an idle Walsh code which is not assigned to any spreading code in accordance with the assignment order information retained in said retaining means, said idle Walsh code having an assignment request bit length to be assigned to a communication channel for which an assignment request is issued; and assigning means for assigning said idle Walsh code, which has been retrieved by said retrieving means, to the spreading code of the communication channel for which the assignment request is issued, wherein said controlling means further includes position setting means for setting a plurality of retrieve starting positions for respective bit lengths of the plurality of Walsh codes so that said retrieving means starts the retrieving of the idle Walsh code at a retrieve starting position which has been set by said position setting means and corresponds to a the assignment request bit length.

22. An apparatus for assigning a plurality of Walsh codes having different bit lengths to respective spreading codes of a plurality of communication channels, said apparatus comprising:

retaining means for retaining assignment order information about an order of assignment of the plurality of Walsh codes such that one Walsh code having a smaller bit length becomes unable to be orthogonally separated as being precedent over another Walsh code having a larger bit length; and controlling means for controlling Walsh code assignment, said controlling means including:

retrieving means for retrieving, among the plurality of Walsh codes, an idle Walsh code which is not assigned to any spreading code in accordance with the assignment order information retained in said retaining means, said idle Walsh code having an assignment request bit length to be assigned to a communication channel for which an assignment request is issued; and assigning means for assigning said idle Walsh code, which has been retrieved by said retrieving means, to the spreading code of the communication channel for which the assignment request is issued, wherein said controlling means further includes:

group setting means for setting a plurality of groups by dividing the assignment order information, which is retained in said retaining means, into the plurality of groups; and group controlling means for performing a group control by allocating one of the plurality of groups as a retrieve starting group for the retrieving that is to be performed by said retrieving means with respect to an individual type of the plurality of communication channels.

23. An apparatus according to claim 22, wherein said group controlling means respectively allocates the plurality of communication channels of a last-named individual type to different retrieve starting groups.

24. An apparatus according to claim 22, wherein said group controlling means sets a retrieving group the idle Walsh code with respect to the individual type of the plurality of communication channels over a part of the plurality of groups.

25. An apparatus according to claim 22, wherein the individual type of the plurality of communication channels is defined in terms of lengths of estimated time periods during which respective communication channels occupy individual Walsh codes.

26. An apparatus according to claim 22, wherein the individual type of the plurality of communication channels is defined in terms of priorities among the plurality of communication channels.

27. An apparatus according to claim 22, wherein the individual type of the plurality of communication channels is defined in terms of data rates of respective communication channels.

28. An apparatus for assigning a plurality of Walsh codes having different bit lengths to respective spreading codes of a plurality of communication channels, said apparatus comprising:

retaining means for retaining assignment order information about an order of assignment of the plurality of Walsh codes such that one Walsh code having a smaller bit length becomes unable to be orthogonally separated as being precedent over another Walsh code having a larger bit length; and controlling means for controlling Walsh code assignment, said controlling means including:

retrieving means for retrieving, among the plurality of Walsh codes, an idle Walsh code which is not assigned to any spreading code in accordance with the assignment order information retained in said retaining means, said idle Walsh code having an assignment request bit length to be assigned to a communication channel for which an assignment request is issued; and assigning means for assigning said idle Walsh code, which has been retrieved by said retrieving means, to the spreading code of the communication channel for which the assignment request is issued, wherein said controlling means further includes position and direction setting means for setting a plurality of retrieve starting positions and retrieve directions for respective bit lengths of the plurality of Walsh codes so that said retrieving means starts retrieving the idle Walsh code at a retrieve starting position in a retrieve direction, which have been set by said position and direction setting means and correspond to the assignment request bit length.

29. An apparatus for assigning a plurality of Walsh codes having different bit lengths to respective spreading codes of a plurality of communication channels, said apparatus comprising:

retaining means for retaining assignment order information about an order of assignment of the plurality of Walsh codes such that one Walsh code having a smaller bit length becomes unable to be orthogonally separated as being precedent over another Walsh code having a larger bit length; and controlling means for controlling Walsh code assignment, said controlling means including:

retrieving means for retrieving, among the plurality of Walsh codes, an idle Walsh code which is not assigned to any spreading code in accordance with the assignment order information retained in said retaining means, said idle Walsh code having an assignment request bit length to be assigned to a communication channel for which an assignment request is issued; and assigning means for assigning said idle Walsh code, which has been retrieved by said retrieving means, to the spreading code of the communication channel for which the assignment request is issued, wherein said controlling means further includes:

group setting means for setting a plurality of groups by dividing the assignment order information, which is retained in said retaining means, into the plurality of groups; and group controlling means for performing an group control by allocating one of the plurality of groups as a retrieve starting group for the retrieving that is to be performed by said retrieving means with respect to an individual type of the plurality of communication channels.

30. An apparatus according to claim 29, wherein said group controlling means respectively allocates the plurality of communication channels of a last-named individual type to the different retrieve starting groups.

31. An apparatus according to claim 29, wherein said group controlling means sets a retrieving group the idle Walsh code with respect to the individual type of the plurality of communication channels over a part of the plurality of groups.

32. An apparatus according to claim 29 the individual type of the plurality of communication channels is defined in terms of lengths of estimated time periods during which respective communication channels occupy individual Walsh codes.

33. An apparatus according to claim 29, wherein the individual type of the plurality of communication channels is defined in terms of priorities among the plurality of communication channels.

34. An apparatus according to claim 29, wherein the individual type of the plurality of communication channels is defined in terms of data rates of respective communication channels.

35. An apparatus for assigning a plurality of Walsh codes having different bit lengths to respective spreading codes of a plurality of communication channels, said apparatus comprising:

retaining means for retaining assignment order information about an order of assignment of the plural Walsh codes such that one Walsh code having a smaller bit length becomes unable to be orthogonally separated as being precedent over another Walsh code having a larger bit length; and controlling means for controlling Walsh code assignment, said controlling means including:

retrieving means for retrieving, among the plural Walsh codes, an idle Walsh code which is not assigned to any spreading code in accordance with the assignment order information retained in said retaining means, said idle Walsh code having an assignment request bit length to be assigned to a communication channel for which an assignment request is issued; and assigning means for assigning said idle Walsh code, which has been retrieved by said retrieving means, to the spreading code of the communication channel for which the assignment request is issued, wherein said controlling means further includes:

group setting means for setting a plurality of groups by dividing the assignment order information, which is retained in said retaining means, into the plurality of groups; and group controlling means for performing group control by allocating one of the plurality of groups as a retrieve starting group for the retrieving that is to be performed by said retrieving means with respect to an individual type of the plurality of communication channels.

36. An apparatus according to claim 35, wherein said group controlling means respectively allocates the plurality of communication channels of a last-named individual type to the different retrieve starting groups.

37. An apparatus according to claim 35, wherein said group controlling means sets a retrieving group of the idle Walsh code with respect to the individual type of the plurality of communication channels over a part of the plurality of groups.

38. An apparatus according to claim 35, the individual type of the plurality of communication channels is defined in terms of lengths of estimated time periods during which respective communication channels occupy individual Walsh codes.

39. An apparatus according to claim 35, wherein the individual type of the plurality of communication channels is defined in terms of priorities among the plurality of communication channels.

40. An apparatus according to claim 35, wherein the individual type of the plurality of communication channels is defined in terms of data rates of respective communication channels.

* * * * *